US012785080B2

(12) United States Patent
Liu et al.

(10) Patent No.: US 12,785,080 B2
(45) Date of Patent: Nov. 3, 2026

(54) NICKEL-RICH ELECTROACTIVE MATERIALS

(71) Applicant: GM GLOBAL TECHNOLOGY OPERATIONS LLC, Detroit, MI (US)

(72) Inventors: Zhongyi Liu, Troy, MI (US); Mengyuan Chen, Madison Heights, MI (US); Bradley R. Frieberg, Farmington Hills, MI (US); Xiaosong Huang, Novi, MI (US); Ratandeep Singh Kukreja, Auburn Hills, MI (US); Nicholas Paul William Pieczonka, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 824 days.

(21) Appl. No.: 18/094,145

(22) Filed: Jan. 6, 2023

(65) Prior Publication Data

US 2024/0243258 A1 Jul. 18, 2024

(51) Int. Cl.
*H01M 4/36* (2006.01)
*C01G 53/50* (2025.01)
(Continued)

(52) U.S. Cl.
CPC ............ *H01M 4/366* (2013.01); *C01G 53/50* (2013.01); *C01G 53/506* (2025.01);
(Continued)

(58) Field of Classification Search
CPC ..................................................... H01M 4/366
See application file for complete search history.

(56) References Cited

U.S. PATENT DOCUMENTS

| | | | |
|---|---|---|---|
| 10,741,812 | B2 | 8/2020 | Luski et al. |
| 11,316,142 | B2 | 4/2022 | Jiang et al. |

(Continued)

FOREIGN PATENT DOCUMENTS

| | | | |
|---|---|---|---|
| CN | 111564606 | A | 8/2020 |
| CN | 118315529 | A | 7/2024 |

(Continued)

OTHER PUBLICATIONS

Haruo Imagawa et al.; "Monodisperse $CeO_2$ Nanoparticles and Their Oxygen Storage and Release Properties"; The Journal of Physical Chemistry; Jan. 18, 2011; pp. 1740-1745.

(Continued)

*Primary Examiner* — William D Young
(74) *Attorney, Agent, or Firm* — Harness, Dickey & Pierce, P.L.C.

(57) ABSTRACT

An electroactive material for an electrochemical cell includes one or more oxygen storage material coatings or layers. The electroactive material may include a plurality of electroactive material particles disposed to form an electroactive material layer. In certain variations, at least a portion of the plurality of electroactive material particles may have a coating that includes an oxygen storage material. In other variations, an oxygen storage material layer may be disposed on one or more surfaces of the electroactive material layer. In still other variations, at least a portion of the plurality of electroactive material particles may have a coating that includes an oxygen storage material, and an oxygen storage material layer may be disposed on one or more surfaces of the electroactive material layer. The one or more oxygen storage material coatings or layers may help to improve the thermal stability of the electroactive materials.

19 Claims, 13 Drawing Sheets

(51) Int. Cl.
*C01G 53/506* (2025.01)
*H01M 4/505* (2010.01)
*H01M 4/525* (2010.01)

(52) U.S. Cl.
CPC ........... *H01M 4/505* (2013.01); *H01M 4/525* (2013.01); *C01P 2002/52* (2013.01); *C01P 2004/02* (2013.01); *C01P 2004/84* (2013.01); *C01P 2006/40* (2013.01)

(56) References Cited

U.S. PATENT DOCUMENTS

| | | | | |
|---|---|---|---|---|
| 2014/0087254 | A1* | 3/2014 | Li | C01G 45/1257 429/231 |
| 2019/0190012 | A1 | 6/2019 | Wu et al. | |
| 2021/0109136 | A1 | 4/2021 | Hao | |
| 2021/0151761 | A1 | 5/2021 | Jimenez et al. | |
| 2021/0296691 | A1 | 9/2021 | Kwon | |
| 2021/0408518 | A1 | 12/2021 | Wang et al. | |
| 2022/0037642 | A1 | 2/2022 | Ellison et al. | |
| 2022/0173370 | A1 | 6/2022 | Kong et al. | |
| 2022/0173377 | A1 | 6/2022 | Kong et al. | |
| 2022/0238885 | A1 | 7/2022 | Koestner et al. | |
| 2023/0187639 | A1* | 6/2023 | Ho | H01M 4/625 429/231.95 |
| 2024/0243259 | A1 | 7/2024 | Chen et al. | |

FOREIGN PATENT DOCUMENTS

| | | | |
|---|---|---|---|
| CN | 118315555 | A | 7/2024 |
| DE | 102023121658 | A1 | 7/2024 |
| DE | 102023121659 | A1 | 7/2024 |

OTHER PUBLICATIONS

Marijana Kovacevic et al.; "Effects of Morphology of Cerium Oxide Catalysts for Reverse Water Gas Shift Reaction"; CrossMark; Catal Lett; Feb. 20, 2016; pp. 770-777.

Seong-Ju Sim et al.; "Use of carbon coating on $LiNi_{0.8}Co_{0.1}Mn_{0.1}O_2$ cathode material for enhanced performances of lithium-ion batteries"; Scientific Reports, Nature Research; Jul. 6, 2020; 9 pages.

Seong-Min Bak et al.; "Structural Changes and Thermal Stability of Charged $LiNi_xMn_yCo_zO_2$ Cathode Materials Studied by Combined In Situ Time-Resolved XRD and Mass Spectroscopy"; American Chemical Society Applied Materials & Interfaces, Nov. 24, 2014; pp. 22594-22601.

Sk. Anirban et al.; "Vacancy mediated ionic conduction in Dy substituted nanoceria: A structure-property correlation study"; Royal Society of Chemistry Advances; May 2015, 5; pp. 50186-50195.

Yiguang Zhou et al.; "Introducing Oxygen Vacancies in $Li_4Ti_5O_{12}$ via Hydrogen Reduction for High-Power Lithium-Ion Batteries"; Processes; Sep. 14, 2021, 9 1655; https://doi.org/10.3390/pr9091655; 13 pages.

Zhang Tianshu et al.; "Ionic conductivity in the $CeO_2$—$Gd_2O_3$ system ($0.05 \leq Gd/Ce \leq 0.4$) prepared by oxalate coprecipitation"; Solid Sate Ionics, 148, (2002); pp. 567-573.

Non-Final Office Action issued Feb. 19, 2026, for U.S. Appl. No. 18/094,163; 20 pages.

Final Office Action issued Jun. 11, 2026, for U.S. Appl. No. 18/094,163; 13 pages.

* cited by examiner

NICKEL-RICH ELECTROACTIVE MATERIALS

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator filled with a liquid or solid electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte (or solid-state separator), the solid-state electrolyte (or solid-state separator) may physically separate the electrodes so that a distinct separator is not required.

Many different materials may be used to create components for a lithium-ion battery. For example, in various aspects, positive electrodes include nickel-rich electroactive materials (e.g., having greater than or equal to about 0.6, and in certain variations, optionally greater than or equal to about 0.8 mole fraction, of nickel (Ni) on transition metal lattice), such as NMC ($LiNi_{1-x-y}Co_xMn_yO_2$) (where 0.01≤x≤0.33, 0.01≤y≤0.33) or NCMA ($LiNi_{1-x-y-z}Co_xMn_yAl_zO_2$) (where 0.02≤x≤0.20, 0.01≤y≤0.12, 0.01≤z≤0.08), which are capable of providing improved capacity capability (e.g., greater than 200 mAh/g) while allowing for additional lithium extraction without compromising the structural stability of the positive electrode. Such materials, however, often decompose at low temperatures (e.g., below 300° C.), generating oxygen and boosting various exothermal side reactions within the cell, which can result in thermal propagation and/or runaway. Accordingly, it would be desirable to develop improved active materials, and methods of making and using the same, that can address these challenges.

SUMMARY

This section provides a general summary of the disclosure, and is not a comprehensive disclosure of its full scope or all of its features.

The present disclosure relates to electroactive materials and to methods of making and using the same. The electroactive materials may include one or more oxygen storage material coatings or layers. The one or more oxygen storage material coatings or layers may help to improve the thermal stability of the electroactive materials.

In various aspects, the present disclosure provides an electroactive material for an electrochemical cell. The electroactive material may include a plurality of electroactive material particles, where at least a portion of the plurality of electroactive material particles have a coating that includes an oxygen storage material.

In one aspect, the oxygen storage material may be selected from the group consisting of: cerium oxide ($CeO_2$), manganese oxide ($MnO_2$), and combinations thereof.

In one aspect, at least a portion of the oxygen storage material may be in solid solution with a cation, and the electroactive material particles of the plurality having the coating may have a lithium diffusion coefficient greater than or equal to about $10^{-15}$ $cm^2 \cdot s$ at about 25° C.

In one aspect, the cation may be an aliovalent and/or isovalent cation selected from the group consisting of: $Gd^{3+}$, $Sm^{3+}$, $Zr^{4+}$, $Cu^{2+}$, $Ti^{4+}$, $Ca^{2+}$, $La^{3+}$, $Sr^{2+}$, $Co^{3+}$, $Fe^{3}$, $Al^{3+}$, and combinations thereof.

In one aspect, greater than 0 wt. % to less than or equal to about 10 wt. % of the electroactive material particles of the plurality may include the coating.

In one aspect, the electroactive material particles may include a nickel-rich electroactive material represented by:

$$LiM^1_xM^2_yM^3_zNi_{(1-x-y-z)}O_2$$

where $M^1$, $M^2$, and $M^3$ are each a transition metal independently selected from the group consisting of: manganese (Mn), cobalt (Co), aluminum (Al), iron (Fe), and combinations thereof, where 0≤x≤1, 0≤y≤1, and 0≤z≤1 and 1−x−y−z is greater than 0.6

In one aspect, the coating may be a discontinuous coating that covers less than or equal to about 90% of a total surface area of the respective electroactive material particles.

In one aspect, the coating may be a continuous coatings that covers greater than or equal to about 90% of a total surface area of the respective electroactive material particles.

In one aspect, the coating may have an average thicknesses greater than or equal to about 2 nanometers to less than or equal to about 200 nanometers.

In various aspects, the present disclosure provides a method for preparing an electroactive material for an electrochemical cell. The method may include sintering a precursor oxygen storage material precipitated on surfaces of a plurality of electroactive material particles in a solvent, where during the sintering, the precursor oxygen storage material may be reduced to form an oxygen storage material on the surfaces, and the plurality of electroactive material particles and the oxygen storage material defines the electroactive material.

In one aspect, the electroactive material particles may include a nickel rich electroactive material represented by:

$$LiM^1_xM^2_yM^3_zNi_{(1-x-y-z)}O_2$$

where $M^1$, $M^2$, and $M^3$ are each a transition metal independently selected from the group consisting of: manganese (Mn), cobalt (Co), aluminum (Al), iron (Fe), and combinations thereof, where 0≤x≤1, 0≤y≤1, and 0≤z≤1 and 1−x−y−z is greater than 0.6.

In one aspect, the solvent may be selected from the group consisting of: water, 1-octadecene, oleylamine, diphenyl ether, oleic acid, cetyltrimethyl ammonium bromide, octadecylamine, 1,2-hexadecanediol, polyethylene glycol, and combinations thereof.

In one aspect, the precursor oxygen storage material may be selected from the group consisting of: ceric ammonium nitrate, cerium nitrate, cerium acetate, cerium hydroxide, cerium chloride, cerium acetylacetonate hydrate, cerium tri(methylsilyl)amide, cerium tetrakis(diisopropylamide), and combination thereof.

In one aspect, the method may further include precipitating the precursor oxygen storage material onto the surfaces of the electroactive material particles. The precipitating may include contacting a precipitant to an admixture that includes the precursor oxygen storage material, the plurality of electroactive material particles, and the solvent.

In one aspect, the precipitant may be selected from the group consisting of: sodium hydroxide, ammonium hydroxide, ammonium bicarbonate, potassium carbonate, sodium carbonate, poly(vinylpyrrolidone), citric acid, trisodium phosphate dodecahydrate, dithio-polydopamine, 1,4-butanediol, ethylenediamine, ethylene glycol, methanol, folic acid, tetrabutyl ammonium hydroxide, and combinations thereof.

In one aspect, the method may further include preparing the admixture. Preparing the admixture may include contacting the precursor oxygen storage material and the precursor electroactive material to the solvent to form the admixture and agitating the admixture.

In one aspect, the admixture may include greater than or equal to about 0.1 wt. % to less than or equal to about 5 wt. % of the precursor oxygen storage material, greater than or equal to about 5 wt. % to less than or equal to about 90 wt. % of the plurality of electroactive material particles, and greater than or equal to about 5 wt. % to less than or equal to about 90 wt. % of the solvent.

In one aspect, the sintering may include heating the precursor oxygen storage material to a temperature greater than or equal to about 300° C. to less than or equal to about 1,000° C.

In various aspects, the present disclosure provides a method for preparing an electroactive material for an electrochemical cell. The method may include precipitating an oxygen storage material precursor onto surfaces of a plurality of electroactive material particles by contacting a precipitant to an admixture that includes the oxygen storage material precursor and the plurality of electroactive material particles to form a coating comprising the oxygen storage material precursor, and sintering the coating including the oxygen storage material precursor by heating the oxygen storage material precursor to a temperature greater than or equal to about 300° C. to less than or equal to about 1,000° C. to form a coating comprising an oxygen storage material on the surfaces of the plurality of electroactive material particles.

In one aspect, the method may further include preparing the admixture. Preparing the solution may include contacting the oxygen storage material precursor and the plurality of electroactive material particles to the solvent to form the admixture and agitating the admixture.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein is for illustrative purposes only of selected embodiments and not all possible implementations, and is not intended to limit the scope of the present disclosure.

Corresponding reference numerals indicate corresponding parts throughout the several views of the drawings.

DETAILED DESCRIPTION

Figure 1:
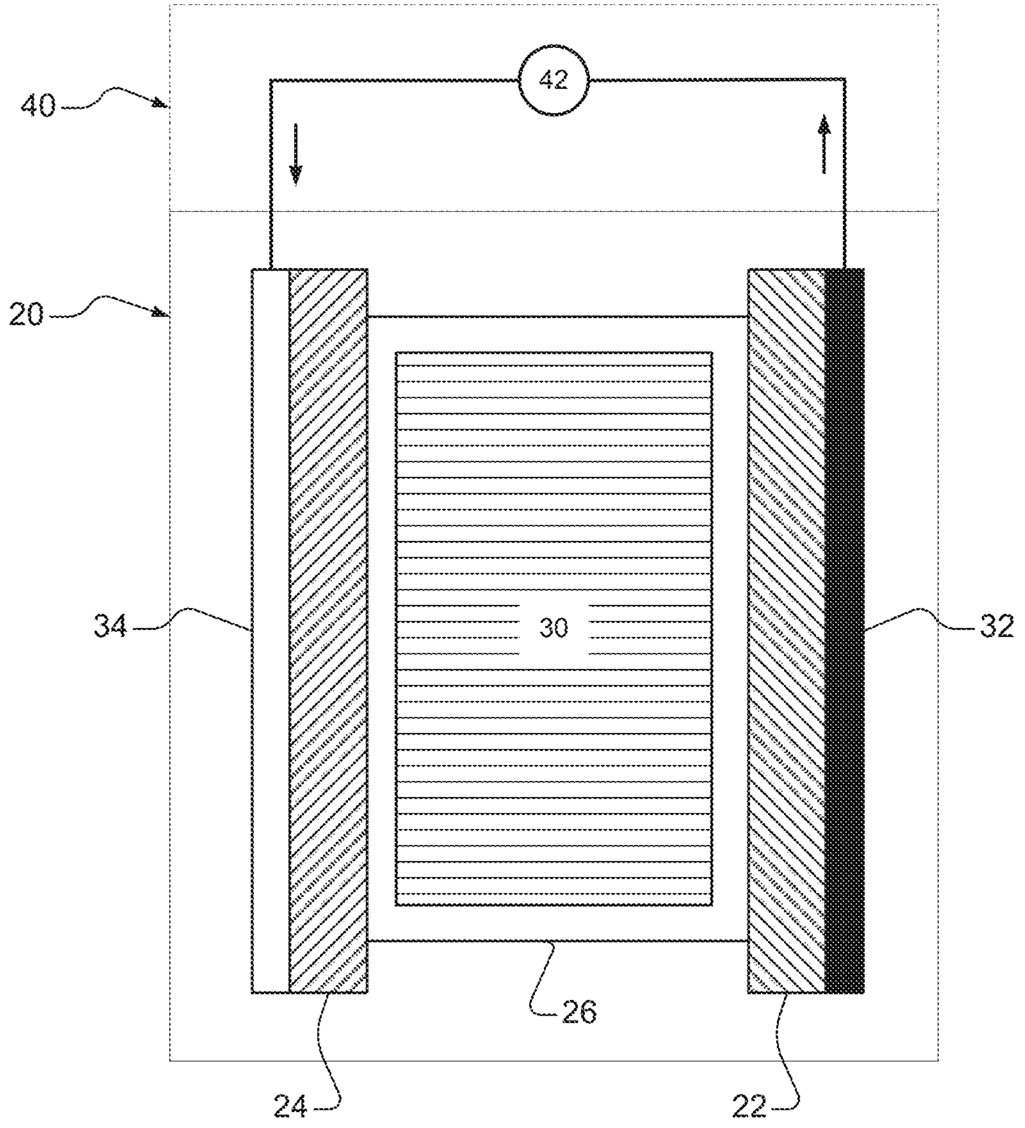
FIG. 1 is an illustration of an example electrochemical cell including an electroactive material including one or more oxygen storage material coatings or layers in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure relates to electroactive materials including a coating or layer comprising one or more oxygen storage materials, also referred to herein as an oxygen storage material coating or layer. In certain variations, the one or more oxygen storage material coatings or layers helps to improve the thermal stability of the electroactive materials. Although the following discussion is directed to lithium-ion electrochemical cells that cycle lithium ions, it should be appreciated that similar teachings also apply to calcium-ion electrochemical cells that cycle calcium ions, sodium-ion electrochemical cells that cycle sodium ions, and/or potassium-ion electrochemical cells that cycle potassium ions. The electrochemical cells can be used in vehicle or automotive transportation applications (e.g., motorcycles, boats, tractors, buses, motorcycles, mobile homes, campers, and tanks). However, the present technology may also be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive layers disposed on or adjacent to one or more surfaces thereof.

An exemplary and schematic illustration of an electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation-prevents physical contact-between the electrodes 22, 24. The separator 26 also provides a minimal resistance path for internal passage of lithium ions, and in certain instances, related anions, during cycling of the lithium ions. In various aspects, the separator 26 may include an electrolyte 30 that may, in certain aspects, also be present in the negative electrode 22 and/or the positive electrode 24, so as to form a continuous electrolyte network. In certain variations, the separator 26 may be formed by a solid-state electrolyte or a semi-solid-state electrolyte (e.g., gel electrolyte). For example, the separator 26 may include a plurality of solid-state electrolyte particles and/or a gel electrode. The negative electrode 22 and/or the positive electrode 24 may additionally or alternatively include a plurality of solid-state electrolyte particles and/or a gel electrolyte. The solid-state electrolyte particles and/or gel electrolyte as included in, or defining, the separator 26 may be the same as or different from the solid-state electrolyte particles and/or gel electrode included in the positive electrode 24 and/or the negative electrode 22, and the solid-state electrolyte particles and/or gel electrolyte as included in the positive electrode 24 may be the same as or different from the solid-state electrolyte particles and/or gel electrolyte as included in negative electrode 22.

A first current collector 32 (e.g., a negative current collector) may be positioned at or near the negative electrode (which can also be referred to as a negative electroactive material layer) 22. The first current collector 32 together with the negative electrode 22 may be referred to as a negative electrode assembly. Although not illustrated, the skilled artisan will appreciate that, in certain variations, negative electroactive material layers 22 may be disposed on one or more parallel sides of the first current collector 32. Similarly, the skilled artisan will appreciate that, in other variations, a negative electroactive material layer 22 may be disposed on a first side of the first current collector 32, and a positive electroactive material layer 24 may be disposed on a second side of the first current collector 32. In each instance, the first current collector 32 may be a metal foil, metal grid or screen, or expanded metal comprising copper or any other appropriate electrically conductive material known to those of skill in the art.

A second current collector 34 (e.g., a positive current collector) may be positioned at or near the positive electrode (which can also be referred to as a positive electroactive material layer) 24. The second current collector 34 together with the positive electrode 24 may be referred to as a positive electrode assembly. Although not illustrated, the skilled artisan will appreciate that, in certain variations, positive electroactive material layer 24 may be disposed on one or more parallel sides of the second current collector 34. Similarly, the skilled artisan will appreciate that, in other variations, a positive electroactive material layer 24 may be disposed on a first side of the second current collector 34, and a negative electroactive material layer 22 may be disposed on a second side of the second current collector 34. In each instance, the second electrode current collector 34 may be a metal foil, metal grid or screen, or expanded metal comprising aluminum or any other appropriate electrically conductive material known to those of skill in the art.

The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34). The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for the purpose of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24, may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC), vinylene carbonate (VC), and the like), linear carbonates (e.g., dimethyl carbonate (DMC), diethyl carbonate (DEC), ethylmethylcarbonate (EMC), and the like), aliphatic carboxylic esters (e.g., methyl formate, methyl acetate, methyl propionate, and the like), γ-lactones (e.g., γ-butyrolactone, γ-valerolactone, and the like), chain structure ethers (e.g., 1,2-dimethoxyethane, 1-2-diethoxyethane, ethoxymethoxyethane, and the like), cyclic ethers (e.g., tetrahydrofuran, 2-methyltetrahydrofuran, 1,3-dioxolane, and the like), sulfur compounds (e.g., sulfolane), and combinations thereof.

The separator 26 may be a porous separator. For example, in certain instances, the separator 26 may be a microporous polymeric separator including, for example, a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separators 26 include CELGARD® 2500 (a monolayer polypropylene separator)) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous member having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material. The ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: NOMEX™ meta-aramid (e.g., an aromatic polyamide formed from a condensation reaction from monomers m-phenylendiamine and isophthaloyl chloride), ARAMID aromatic polyamide, and combinations thereof.

Various conventionally available polymers and commercial products for forming the separator 26 are contemplated, as well as the many manufacturing methods that may be employed to produce such a microporous polymer separator 26. For example, in certain variations, the separator 26 may be a polyolefin-based separator including, for example, polyacetylene, propylene (PP), and/or polyethylene (PE); a cellulose separator including, for example, polyvinylidene fluoride (PVDF) member and/or a porous polyimide member; and/or a high-temperature-stable separators including, for example, polyimide (PI) nanofiber-based nonwoven members, nano-sized aluminum oxide ($Al_2O_3$) and poly (lithium 4-styrenesulfonate)-coated polyethylene members silicon oxide ($SiO_2$) coated polyethylene (PE) members, co-polyimide-coated polyethylene members, polyetherimides (PEI) (bisphenol-aceton diphthalic anhydride (BPADA) and para-phenylenediamine) members, expanded polytetrafluoroethylene reinforced polyvinylidenefluoride-hexafluoropropylene members, and/or sandwiched-structure polyvinylidene fluoride (PVDF)-poly(m-phenylene isophthalamide) (PMIA)-polyvinylidene fluoride (PVDF) members. In each instance, the separator 26 may have an average thickness greater than or equal to about 1 micrometer (μm) to less than or equal to about 50 μm, and in certain instances, optionally greater than or equal to about 1 μm to less than or equal to about 20 μm; and the electrolyte 30 may wet greater than or equal to about 5 vol. % to less than or equal to about 100 vol. %, of a total porosity of the separator 26.

In various aspects, the porous separator 26 and/or the electrolyte 30 disposed in the porous separator 26 as illustrated in FIG. 1 may be replaced with a solid-state electrolyte ("SSE") and/or semi-solid electrolyte (e.g., gel) that functions as both an electrolyte and a separator. For example, the solid-state electrolyte and/or semi-solid-state electrolyte may be disposed between the positive electrode 24 and negative electrode 22. The solid-state electrolyte and/or semi-solid-state electrolyte facilitates transfer of lithium ions, while mechanically separating and providing electrical insulation between the negative and positive electrodes 22, 24.

The solid-state electrolyte and/or semi-solid electrolyte may include a plurality of solid-state electrolyte particles. In certain variations, the electrolyte 30 may at least partially fill voids (e.g., interparticle porosity) between the solid-state electrolyte particles defining the separator 26. In each variation, the solid-state electrolyte particles may include, for example, oxide-based solid-state particles (such as garnet type solid-state particles (e.g., $Li_7La_3Zr_2O_{12}$ (LLZO)), perovskite type solid-state particles (e.g., $Li_{3x}La_{2/3-x}TiO_3$, where 0<x<0.167), NASICON type solid-state particles (e.g., $Li_{1.4}Al_{0.4}Ti_{1.6}(PO_4)_3$, $Li_{1+x}Al_xGe_{2-x}(PO_4)_3$ (where 0≤x≤2) (LAGP)), and/or LISICON type solid-state particles (e.g., $Li_{2+2x}Zn_{1-x}GeO_4$, where 0<x<1)), metal-doped or aliovalent-substituted oxide solid-state particles (such as aluminum (Al) or niobium (Nb) doped $Li_7La_3Zr_2O_{12}$, antimony (Sb) doped $Li_7La_3Zr_2O_{12}$, gallium (Ga) substituted $Li_7La_3Zr_2O_{12}$, chromium (Cr) and/or vanadium (V) substituted $LiSn_2P_3O_{12}$, and/or aluminum (Al) substituted $Li_{1+x+y}Al_xTi_{2-x}Si_yP_{3-y}O_{12}$ (where 0<x<2 and 0<y<3)), sulfide-based solid-state particles (such as $Li_2S—P_2S_5$ systems (e.g., $Li_3PS_4$, $Li_7P_3S_{11}$, and $Li_{9.6}P_3S_{12}$), $Li_2S—SnS_2$ systems (e.g., $Li_4SnS_4$), $Li_{10}GeP_2S_{12}$ (LGPS), $Li_{3.25}Ge_{0.25}P_{0.75}S_4$ (thio-LISICON), $Li_{3.4}Si_{0.4}P_{0.6}S_4$, $Li_{10}GeP_2S_{11.7}O_{0.3}$, lithium argyrodite ($Li_6PS_5X$, where X is CL, Br, or I), $Li_{9.54}Si_{1.74}P_{1.44}S_{11.7}Cl_{0.3}$, $Li_{9.6}P_3S_{12}$, $Li_7P_3S_{11}$, $Li_9P_3S_9O_3$, $Li_{10.35}Ge_{1.35}P_{1.65}S_{12}$, $Li_{10.35}Si_{1.35}P_{1.65}S_{12}$, $Li_{9.81}Sn_{0.81}P_{2.18}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.933}Sn_{0.833}As_{0.166}S_4$, LiI—$Li_4SnS_4$, and/or $Li_4SnS_4$), nitride-based solid-state particles (such as $Li_3N$, $Li_7PN_4$, and/or $LiSi_2N_3$), hydride-based solid-state particles (such as $LiBH_4$, $LiBH_4$—LiX (where X═Cl, Br, or I), $LiNH_2$, $Li_2NH$, $LiBH_4—LiNH_2$, and/or $Li_3AlH_6$), halide-based solid-state particles (such as $Li_3YCl_6$, $Li_3InCl_6$, $Li_3YBr_6$, LiI, $Li_7CdC_{14}$, $Li_2MgCl_4$, $LiCdI_4$, $Li_7ZnI_4$, and/or $Li_3OCl$), and/or borate-based solid-state particles ($Li_2B_4O_7$ and/or $Li_7O—B_2O_3—P_2O_5$).

The semi-solid electrolyte may include a polymer host and a liquid electrolyte. The polymer host may include, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), carboxymethyl cellulose (CMC), poly (vinyl alcohol) (PVA), polyvinylpyrrolidone (PVP), and combinations thereof. The liquid electrolyte may be like the electrolyte 30 detailed above. In certain variations, the semi-solid or gel electrolyte may also be found in the negative electrode 22 and/or positive electrode 24.

The negative electrode 22 is formed from a lithium host material that is capable of functioning as a negative terminal of a lithium-ion battery. In various aspects, the negative electrode 22 may be defined by a plurality of negative electroactive material particles. The negative electroactive material particles may be disposed in one or more layers so as to define the three-dimensional structure of the negative electrode 22. The electrolyte 30 may be introduced, for example after cell assembly, and contained within pores of the negative electrode 22 (i.e., within voids or spaces between the negative electroactive material particles). In certain variations, the negative electrode 22 may include a plurality of solid-state electrolyte particles dispersed with the negative electroactive material particles. The electrolyte 30 may at least partially file voids or spaces between the negative electroactive material particles and the solid-state electrolyte particles. In each instance, the negative electrode 22 may have an average thickness greater than or equal to about 30 μm to less than or equal to about 500 μm, and in certain aspects, optionally greater than or equal to about 50 μm to less than or equal to about 100 μm.

In certain variations, the negative electroactive material particles may include silicon-containing (or silicon-based) electroactive materials. The silicon-containing electroactive materials may include silicon, lithium-silicon alloys, and other silicon-containing binary and/or ternary alloys. For example, in certain variations, the silicon-containing electroactive material may include elemental silicon (Si), various lithium silicide phases ($Li_xSi_y$, where 0<x<17 and 1<y<4), silicon nanograins embedded in a silicon oxide ($SiO_x$, where 0<x<2) matrix, lithium doped silicon oxide ($Li_ySiO_x$, where 0<x<2 and 0<y<1), and combinations thereof. The silicon-containing electroactive materials may be provided as nano-particles, nano-fibers, nano-tubes, and/or micro-particles.

In other variations, the negative electrode 22 may include one or more other alloying anode materials such as aluminum, germanium, tin, antimony, and/or bismuth). In still other variations, the negative electrode 22 may include a lithium-containing negative electroactive material, such as a lithium alloy and/or a lithium metal. For example, in certain variations, the negative electrode 22 may be defined by a lithium metal foil. In still other variations, the negative electrode 22 may include, for example only, carbonaceous negative electroactive materials (such as, graphite, hard carbon, soft carbon, and the like) and/or metallic active materials (such as tin, aluminum, magnesium, germanium, and alloys thereof, and the like).

In still other variations, the negative electrode 22 may be a composite electrode including a combination of negative electroactive materials. For example, the negative electrode 22 may include a first negative electroactive material and a second negative electroactive material. A ratio of the first negative electroactive material to the second negative electroactive material may be greater than or equal to about 5:95 to less than or equal to about 95:5. In certain variations, the first negative electroactive material may be a alloying anode material including, for example, silicon, aluminum, germanium, and/or tin; and the second negative electroactive material may include a carbonaceous material (e.g., graphite, hard carbon, and/or soft carbon). For example, in certain variations, the negative electroactive material may include a carbonaceous-silicon based composite including, for example, about 10 weight percent (wt. %) $SiO_x$ (where $0 \leq x \leq 2$) and about 90 wt. % graphite.

In each variation, the negative electroactive material may be optionally intermingled with an electronically conductive material (i.e., conductive additive) that provides an electron conductive path and/or a polymeric binder material that improves the structural integrity of the negative electrode 22. For example, the negative electrode 22 may include greater than or equal to about 30 wt. % to less than or equal to about 98 wt. %, and in certain aspects, optionally greater than or equal to about 60 wt. % to less than or equal to about 95 wt. %, of the negative electroactive material; greater than or equal to 0 wt. % to less than or equal to about 30 wt. %, optionally greater than 0 wt. % to less than or equal to about 30 wt. %, and in certain aspects, optionally greater than or equal to about 0.5 wt. % to less than or equal to about 10 wt. %, of the electronically conducting material; and greater than or equal to 0 wt. % to less than or equal to about 20 wt. %, optionally greater than 0 wt. % to less than or equal to about 20 wt. %, and in certain aspects, optionally greater than or equal to about 0.5 wt. % to less than or equal to about 10 wt. %, of the polymeric binder.

Example polymeric binders include polyimide, polyamic acid, polyamide, polysulfone, polyvinylidene difluoride (PVdF), poly(vinylidene fluoride-co-hexafluoropropylene (PVdF-HFP), polytetrafluoroethylene (PTFE), polyacrylic acid (PAA), polychlorotrifluoroethylene, ethylene propylene diene monomer (EPDM) rubber, carboxymethyl cellulose (CMC), nitrile butadiene rubber (NBR), styrene-butadiene rubber (SBR), lithium polyacrylate (LiPAA), sodium polyacrylate (NaPAA), sodium alginate, lithium alginate, and/or styrene copolymers (SEBS). Electronically conducting materials may include, for example, carbon-based materials, powdered nickel or other metal particles, or conductive polymers. Carbon-based materials may include, for example, particles of graphite, acetylene black (such as KETCHEN™ black or DENKA™ black), carbon nanofibers and nanotubes (e.g., single wall carbon nanotubes (SWCNT), multiwall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The positive electrode 24 is formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles. Such positive electroactive material particles may be disposed in one or more layers so as to define the three-dimensional structure of the positive electrode 24. The electrolyte 30 may be introduced, for example after cell assembly, and contained within pores of the positive electrode 24 (i.e., within voids or spaces between the positive electroactive material particles). In certain variations, the positive electrode 24 may include a plurality of solid-state electrolyte particles dispersed with the positive electroactive material particles. The electrolyte 30 may at least partially fill voids or spaces between the positive electroactive material particles and the solid-state electrolyte particles. In each instance, the positive electrode 24 may have an average thickness greater than or equal to about 30 μm to less than or equal to about 500 μm, and in certain aspects, optionally greater than or equal to about 50 μm to less than or equal to about 100 μm.

In certain variations, the positive electrode 24 may be a nickel-rich cathode including a nickel-rich positive electroactive material. The nickel-rich positive electroactive material may comprise greater than or equal to about 60 molar percent, and in certain aspects, optionally greater than or equal to about 80 molar percent, of nickel. In certain aspects, the electroactive material may be represented by the formula:

$$LiM^1_xM^2_yM^3_zM^4_{(1-x-y-z)}O_2$$

where $M^1$, $M^2$, $M^3$, and $M^4$ are each a transition metal (for example, each is independently selected from the group consisting of: nickel (Ni), manganese (Mn), cobalt (Co), aluminum (Al), iron (Fe), and combinations thereof), where $0 \leq x \leq 1$, $0 \leq y \leq 1$, and $0 \leq z \leq 1$. For example, $M^4$ may include nickel (Ni), so that the nickel-rich positive electroactive material is represented by the formula"

$$LiM^1_xM^2_yM^3_zNi_{(1-x-y-z)}O_2$$

where $M^1$, $M^2$, and $M^3$ are independently selected from the group consisting of: manganese (Mn), cobalt (Co), aluminum (Al), iron (Fe), and combinations thereof, where $1-x-y-z$ is such that the nickel (Ni) content is greater than or equal to about 60 molar percent, and in certain aspects, optionally greater than or equal to about 80 molar percent. In certain variations, the nickel-rich positive electroactive material may include $$LiNi_{1-x-y-z}Co_xMn_yAl_zO_2$$

where $0.02 \leq x \leq 0.20$, $0.01 \leq y \leq 0.12$, $0.01 \leq z \leq 0.08$. Further still, in certain variations, the positive electrode 24 may include, additionally or alternatively, NMC ($LiNi_xCo_yMn_{1-x-y}O_2$, where $0.8 \leq x \leq 1$, $0 \leq y \leq 0.4$) and/or NCA ($LiNi_xCo_yAl_{1-x-y}O_2$, where $0.8 \leq x \leq 1$, $0 \leq y \leq 0.4$) and/or NCMA ($LiNi_xCo_yMn_zAl_{1-x-y-z}O_2$, where $0.8 \leq x \leq 1$, $0 \leq y \leq 0.4$, $0 \leq z \leq 0.4$).

In other variations, the positive electroactive material includes a layered oxide represented by $LiMeO_2$, where Me is a transition metal, such as cobalt (Co), nickel (Ni), manganese (Mn), iron (Fe), aluminum (Al), vanadium (V), or combinations thereof. In other variations, the positive electroactive material includes an olivine-type oxide represented by $LiMePO_4$, where Me is a transition metal, such as cobalt (Co), nickel (Ni), manganese (Mn), iron (Fe), aluminum (Al), vanadium (V), or combinations thereof. In still other variations, the positive electroactive material includes a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof. In still other variations, the positive electroactive material includes a spinel-type oxide represented by $LiMe_2O_4$, where Me is a transition metal, such as cobalt (Co), nickel (Ni), manganese (Mn), iron (Fe), aluminum (Al), vanadium (V), or combinations thereof. In still other variations, the positive electroactive material includes a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof.

In still other variations, the positive electrode 24 may be a composite electrode including two or more positive electroactive material. For example, the positive electrode 24 may include a first positive electroactive material and a second positive electroactive material. In certain variations, a mass ratio of the first positive electroactive material to the second positive electroactive material may be greater than or equal to about 1:9 to less than or equal to about 9:1. The first positive electroactive material may include the nickel-rich positive electroactive material. The second positive electroactive material may include, for example, a layered oxide represented by $LiMeO_2$, where Me is a transition metal, such as cobalt (Co), nickel (Ni), manganese (Mn), iron (Fe), aluminum (Al), vanadium (V), or combinations thereof; an olivine-type oxide represented by $LiMePO_4$, where Me is a transition metal, such as cobalt (Co), nickel (Ni), manganese (Mn), iron (Fe), aluminum (Al), vanadium (V), or combinations thereof; a monoclinic-type oxide represented by $Li_3Me_2(PO_4)_3$, where Me is a transition metal, such as cobalt (Co), nickel (Ni), manganese (Mn), iron (Fe), aluminum (Al), vanadium (V), or combinations thereof; a spinel-type oxide represented by $LiMe_2O_4$, where Me is a transition metal, such as cobalt (Co), nickel (Ni), manganese (Mn), iron (Fe), aluminum (Al), vanadium (V), or combinations thereof; and/or a tavorite represented by $LiMeSO_4F$ and/or $LiMePO_4F$, where Me is a transition metal, such as cobalt (Co), nickel (Ni), manganese (Mn), iron (Fe), aluminum (Al), vanadium (V), or combinations thereof.

In still other variations, the positive electroactive material may be selected from the group consisting of: $LiNi_xCo_yMn_{1-x-y}O_2$ where $0.6 \leq x \leq 1$ and $0 \leq y \leq 0.4$ (e.g., NCM), $LiNi_xCo_yAl_{1-x-y}O_2$ where $0.6 \leq x \leq 1$ and $0 \leq y \leq 0.4$ (e.g., NCA), $LiNi_xCo_yMn_zAl_{1-x-y-z}O_2$ where $0.6 \leq x \leq 1$, $0 \leq y \leq 0.4$, and $0 \leq z \leq 0.4$ (e.g., NCMA), $LiNiO_2$ (LNO), $LiCoO_2$ (LCO), $LiNi_{0.5}Mn_{1.5}O_4$ (LNMO), $LiMnPO_4$ (LMP), $LiCoPO_4$ (LCP), $xLi_2MnO_3 \cdot (1-x)LiTMO_2$ (TM=Mn, Ni, and Co etc., $0<x<1$), and combinations thereof.

In each variation, the positive electroactive material may include one or more oxygen storage material coatings or layers and/or one or more conductive oxygen storage material coatings or layers that can help to improve the stability of the positive electroactive material. For example, the oxygen storage material and/or conductive oxygen storage material may be selected to store and release oxygen and may help to stabilize the positive electroactive material by stabilization of oxygen atoms within the coating or layer structure and limiting the availability of the oxygen to react with the electrolyte 30. The one or more oxygen storage material coatings or layers and/or one or more conductive oxygen storage material coatings or layers may be nano-sized coatings.

In certain variations, the oxygen storage material may include monobasic metal oxides, like cerium oxide ($CeO_2$) and/or manganese oxide ($MnO_2$). In other variations, the oxygen storage material may include composite compounds, like $CeO_2$—WC (where WC is tungsten carbide), which can introduce more active sites (i.e., $Ce^{3+}$) having the capability to store and release oxygen. In still further variations, the oxygen storage material may include monobasic metal oxides, solid solutions of the monobasic metal oxides, composite compounds including monobasic metal oxides, and any combination thereof. The oxygen storage material may be provided in an amorphous state, which has higher conductivity than crystalline structure. The amorphous state may be synthesized initially or formed by transforming a crystalline structure, for example, via ball milling to an amorphous state. In an oxygen-rich environment, the oxygen storage material will store oxygen, while in an oxygen-lean environment, the material will release oxygen. When the oxygen storage material includes $CeO_2$, the oxygen storage material coating or layer may store and release oxygen by shifting reversibly between $Ce^{4+}$ and $Ce^{3+}$.

In certain variations, the oxygen storage material may be a conductive material that includes materials having relatively high ionic conductivities. For example, the oxygen storage materials may have a lithium-ion diffusion coefficient greater than or equal to about $10^{-15}$ $cm^2 \cdot s$, and in certain aspects, optionally greater than or equal to about $10^{-15}$ $cm^2 \cdot s$ to less than or equal to about $10^{-5}$ $cm^2 \cdot s$, at about 25° C., while the conductive oxygen storage material may have ionic conductivities greater than or equal to about $10^{-15}$ $cm^2 \cdot s$ to less than or equal to about $10^{-5}$ $cm^2 \cdot s$ at about 25° C. The higher ionic conductivity provides more oxygen vacancies, which can reduce or limit barriers to lithium-ion diffusion. In certain variations, the conductive oxygen storage material may include solid solutions of the monobasic metal oxides with one or more dopants, where the dopants include gadolinium (Gd), samarium (Sm), zirconium (Zr), copper (Cu), titanium (Ti), calcium (Ca), lanthanum (La), strontium (Sr), cobalt (Co), iron (Fe), aluminum (Al), or any combination thereof. For example, the oxygen storage material may be in a solid solution with a cation (e.g., $Gd^{3+}$, $Sm^{3+}$, $Zr^{4+}$, $Cu^{2+}$, $Ti^{4+}$, $Ca^{2+}$, $La^{3+}$, $Sr^{2+}$, $Co^{3+}$, $Fe^{3+}$, and/or $Al^{3+}$), as represented, for example, by $CeO_2$-$M_xO_y$, where M is selected from the group consisting of: gadolinium (Gd), samarium (Sm), zirconium (Zr), copper (Cu), titanium (Ti), calcium (Ca), lanthanum (La), strontium (Sr), cobalt (Co), iron (Fe), aluminum (Al) and combinations thereof and $1 \leq x \leq 2$ and $1 \leq y \leq 3$. For example, the conductive oxygen storage material including the oxygen storage material and another cation may include aliovalent-doping $CeO_2$—$Gd_2O_3$ and/or isovalent-doping $CeO_2$—$ZrO_2$ (p-CZ).

Figure 2:
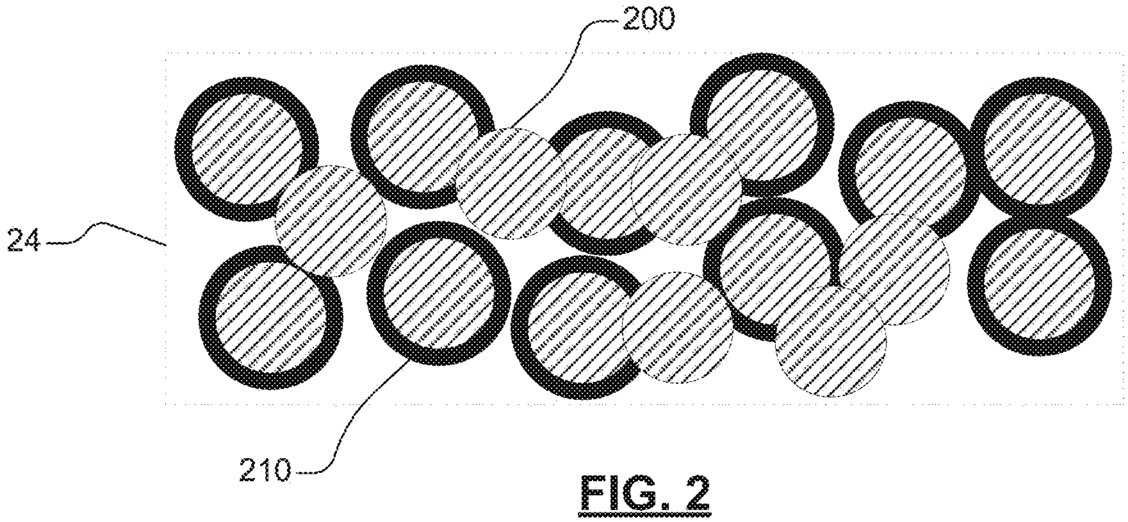
FIG. 2 is an illustration of an example electroactive material including oxygen storage material particle coatings in accordance with various aspects of the present disclosure.

In certain variations, as illustrated in FIG. 2, the oxygen storage material and/or the conductive oxygen storage material may be provided in the form of particle coatings 210 that coat at least a portion of the plurality of positive electroactive material particles 200. For example, greater than 0 wt. % to less than or equal to about 10 wt. %, and in certain aspects, optionally greater than 0 wt. % to less than or equal to about 5 wt. %, of the electroactive material particles may be coated with the oxygen storage material coating, while the remainder of the positive electroactive material particles remain uncoated. The electroactive material particles having a coating comprising the oxygen storage material may be referred to herein as oxygen storage material particles. Although illustrated as continuous coatings covering greater than or equal to about 85%, optionally greater than or equal to about 90%, optionally greater than or equal to about 95%, optionally greater than or equal to about 98%, optionally greater than or equal to about 99%, and in certain aspects, optionally greater than or equal to about 99.5%, of a total surface area of the respective positive electroactive material particles 200, it should be recognized that, in certain variations, the particle coatings 210 may be discontinuous coatings covering any portion of the positive electroactive material particles 200 so as to create more channels for ionic transfer. Further, although the particle 200 is illustrated as an individual particle it should be recognized that, in certain variations, the particle 200 may be collection or accumulation of electroactive material particles. In each instance, the particle coatings 210 may have an average thickness greater than 0 nanometer (nm) to less than or equal to about 200 nanometers, and in certain aspects, optionally greater than or equal to about 2 nanometers to less than or equal to about 200 nanometers. The positive electrode 24 including the particle coatings 210 may include greater than 0 wt. % to less than or equal to about 5 wt. % of the oxygen storage material and/or conductive oxygen storage material. The oxygen storage material particles and/or conductive oxygen storage material defining the particle coating 210 may have an average particle size less than or equal to about 200 nanometers, optionally greater than 0 nanometer to less than or equal to about 200 nanometers, optionally greater than or equal to about 2 nanometer to less than or equal to about 200 nanometers, and in certain aspects, optionally greater than 2 nanometer to less than or equal to about 50 nanometers. Generally, the small particle size of the oxygen storage material particles and/or conductive oxygen storage material may be beneficial because of the comparative high surface area (e.g., greater than about 10 $m^2/g$).

Figure 3:
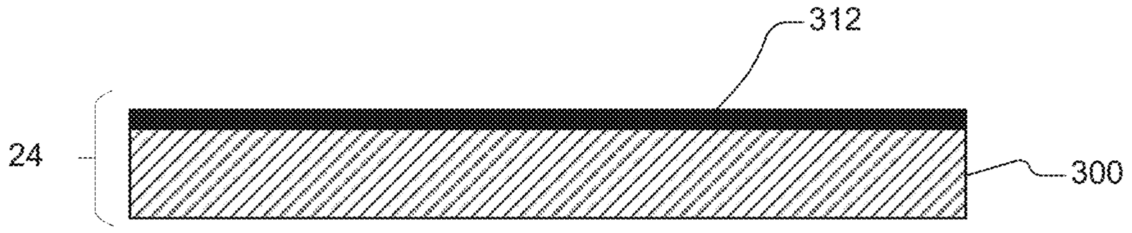
FIG. 3 is an illustration of an example electroactive material including oxygen storage material layer coatings in accordance with various aspects of the present disclosure.

In other variations, as illustrated in FIG. 3, the oxygen storage material and/or conductive oxygen storage material may be provided in the form of a layer coating 312 that coats at least a portion of a surface area of a positive electroactive material layer 300. Although illustrated as a continuous coating covering greater than or equal to about 85%, optionally greater than or equal to about 90%, optionally greater than or equal to about 95%, optionally greater than or equal to about 98%, optionally greater than or equal to about 99%, and in certain aspects, optionally greater than or equal to about 99.5%, of a total surface area of the positive electroactive material layer 300, it should be recognized that, in certain variations, the layer coating 312 may be a discontinuous layer coating covering any portion of the positive electroactive material layer 300 so as to create more channels for ionic transfer. In each instance, the layer coating 312 may have an average thickness greater than 0 nanometers to less than or equal to about 200 nanometers, and in certain aspects, optionally greater than or equal to about 2 nanometers to less than or equal to about 200 nanometers. The positive electrode 24 including the layer coating 312 may include greater than 0 wt. % to less than or equal to about 5 wt. % of the oxygen storage material and/or conductive oxygen storage material. The oxygen storage material particles and/or conductive oxygen storage material defining the layer coating 312 may have an average particle size less than or equal to about 200 nanometers, optionally greater than 0 nanometer to less than or equal to about 200 nanometers, and in certain aspects, optionally greater than 0 nanometer to less than or equal to about 50 nanometers. The small particle size of the oxygen storage material particles and/or conductive oxygen storage material may be beneficial because of the comparative high surface area (e.g., greater than about 10 $m^2/g$).

Figure 4:
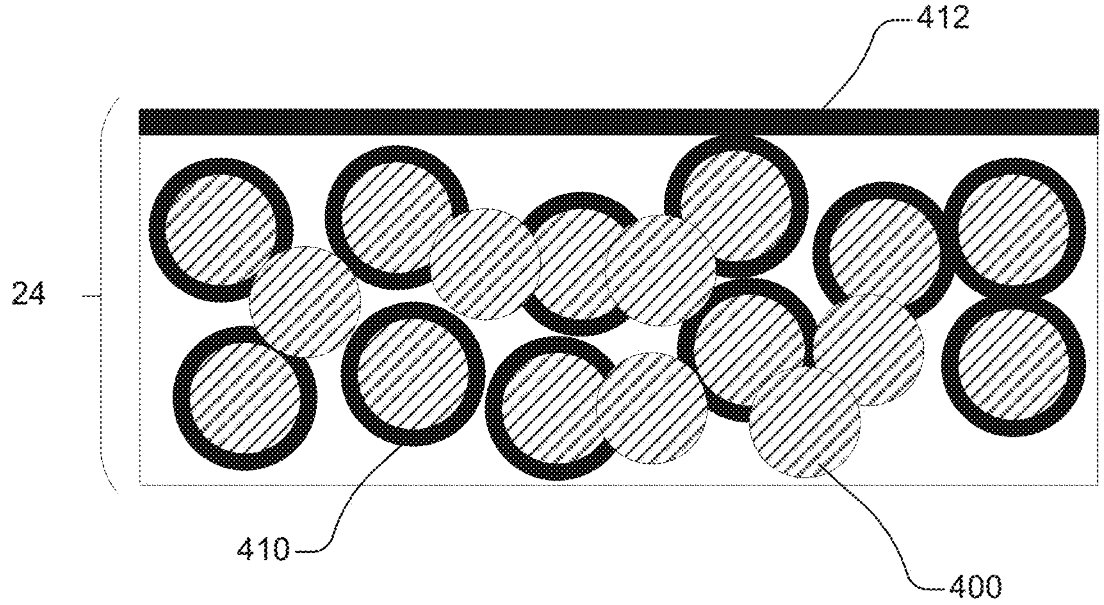
FIG. 4 is an illustration of an example electroactive material including oxygen storage material particle and layer coatings in accordance with various aspects of the present disclosure.

In still further variations, as illustrated in FIG. 4, the oxygen storage material and/or conductive oxygen storage material may include a combination of particle coatings 410 that coat at least a portion of the plurality of positive electroactive material particles 400 and a layer coating 412 that coats at least a portion of a surface area of a positive electroactive material layer 400. Like the particle coating 210 illustrated in FIG. 2, the particle coating 410 may be a continuous or discontinuous particle coating and may have an average thickness greater than 0 nanometer to less than or equal to about 200 nanometers. Like the layer coating 312 illustrated in FIG. 3, the layer coating 412 may be a continuous or discontinuous layer coating and may have an average thickness greater than 0 nanometer to less than or equal to about 200 nanometers. The positive electrode 24 including the particle coating 410 and the layer coating 412 may include greater than 0 wt. % to less than or equal to about 5 wt. % of the oxygen storage material and/or conductive oxygen storage material.

With renewed reference to FIG. 1, in each variation, the positive electroactive material may also be optionally intermingled with an electronically conductive material (i.e., conductive additive) that provides an electron conductive path and/or a polymeric binder material that improves the structural integrity of the positive electrode 24. For example, the positive electrode 24 may include greater than or equal to about 70 wt. % to less than or equal to about 98 wt. %, and in certain aspects, optionally greater than or equal to about 80 wt. % to less than or equal to about 97 wt. %, of the positive electroactive material; greater than or equal to 0 wt. % to less than or equal to about 30 wt. %, optionally greater than 0 wt. % to less than or equal to about 30 wt. %, and in certain aspects, optionally greater than or equal to about 0.5 wt. % to less than or equal to about 10 wt. %, of the electrically conducting material; and greater than or equal to 0 wt. % to less than or equal to about 20 wt. %, optionally greater than 0 wt. % to less than or equal to about 20 wt. %, and in certain aspects, optionally greater than or equal to about 0.5 wt. % to less than or equal to about 10 wt. %, of the polymeric binder. The conductive additive and/or binder material as included in the positive electrode 24 may be the same as or different from the conductive additive as included in the negative electrode 22.

In various aspects, the present disclosure provides methods for preparing electroactive materials, and more particularly, oxygen storage material coatings or layers, like the particle coatings 310, 410 illustrated in FIGS. 2 and 4, respectively, and/or the layer coatings illustrated in FIGS. 3 and 4, respectively. By turning the coating processes, the morphologies and/or charge states and/or vacancy mobilities of the as-prepared coatings may differ, impacting the thermal properties of the electrode assembly including the oxygen storage material coatings or layers, as detailed in the below examples.

Figure 5:
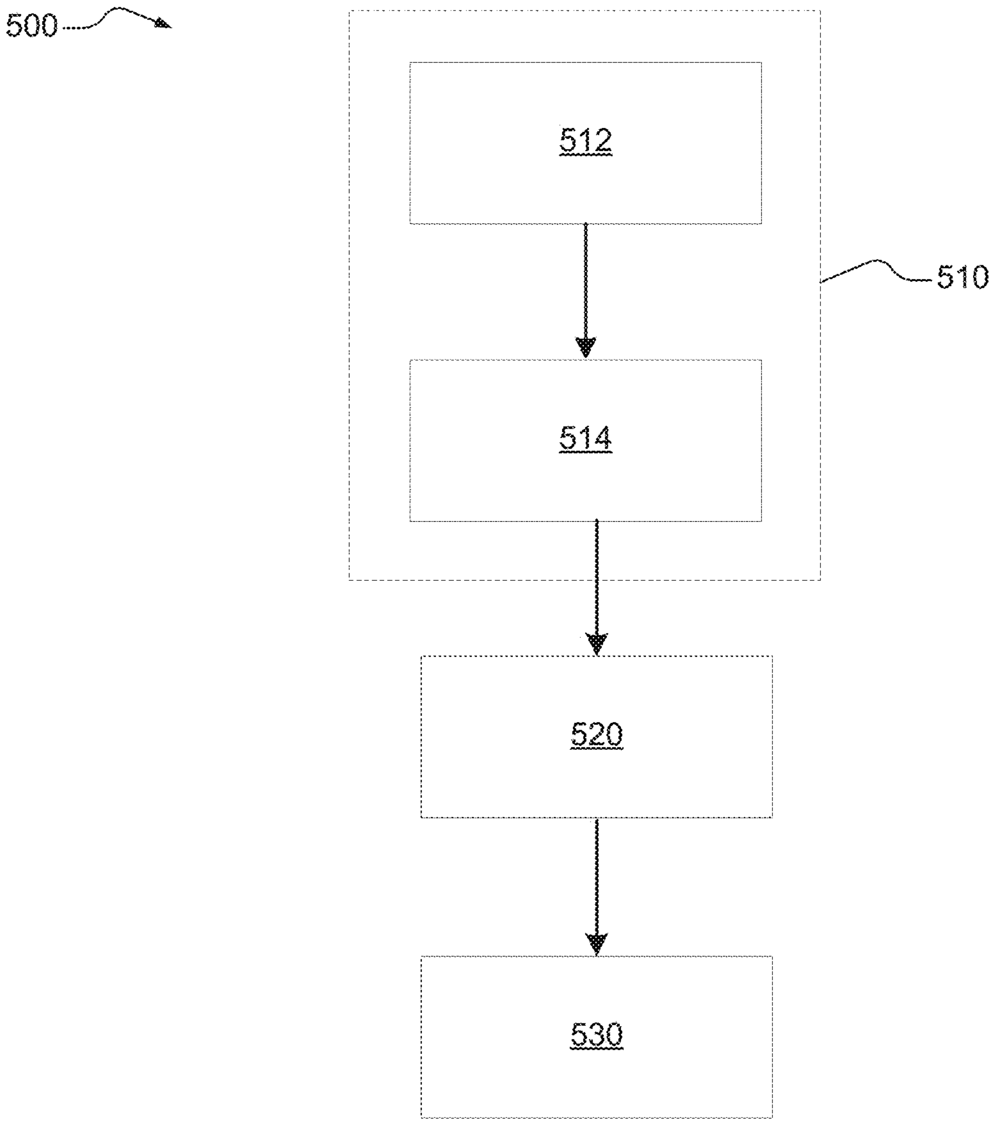
FIG. 5 is a flowchart illustrating an example method for forming electroactive material including one or more oxygen storage material coatings or layers in accordance with various aspects of the present disclosure.
Figure 6A:
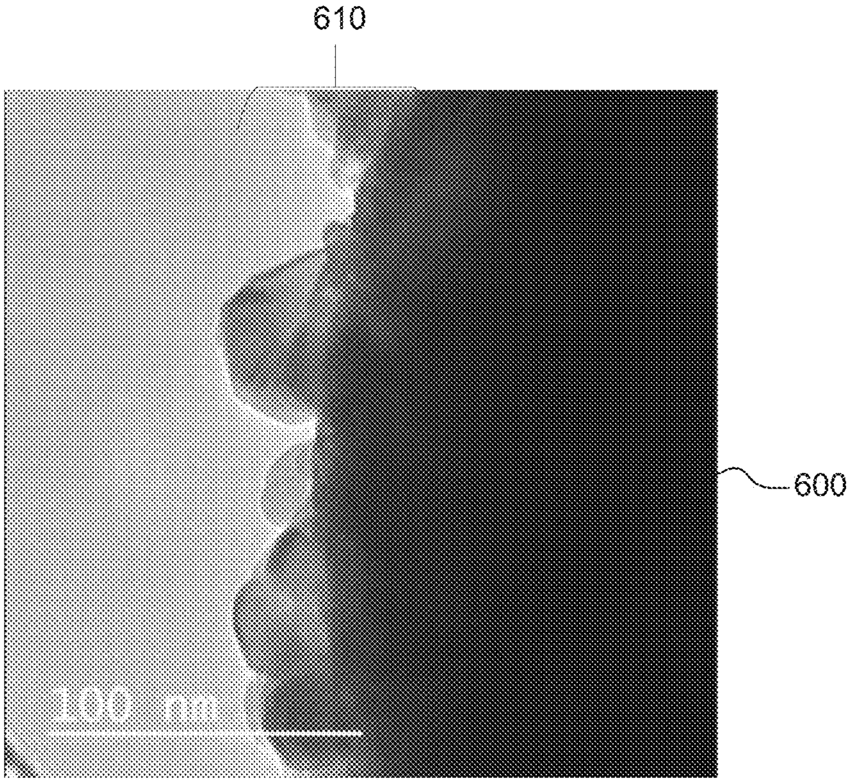
FIG. 6A is a microscopic image (scale 100 nanometers) of an as-formed electroactive material including one or more oxygen storage material coatings or layers prepared using a lower concentrated solution in accordance with various aspects of the present disclosure.
Figure 6B:
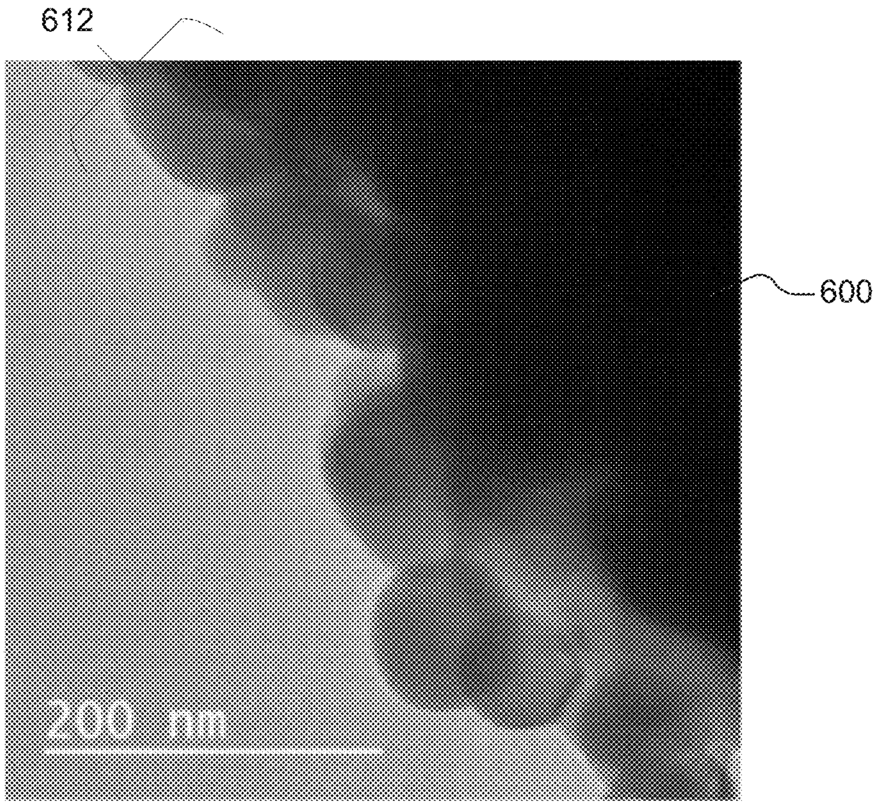
FIG. 6B is a microscopic image (scale 200 nanometers) of an as-formed electroactive material including one or more oxygen storage material coatings or layers prepared using a higher concentrated solution in accordance with various aspects of the present disclosure.

In certain variations, as illustrated in FIG. 5, the method 500 may include preparing 510 an admixture that includes a precursor coating material, a precursor positive electroactive material, and a solvent (also referred to as a carrier) and/or surfactant. The admixture may include greater than or equal to about 0.1 wt. % to less than or equal to about 5 wt. % of the precursor coating material, greater than or equal to about 5 wt. % to less than or equal to about 90 wt. % of the precursor positive electroactive material, and greater than or equal to about 5 wt. % to less than or equal to about 90 wt. % of the solvent and/or surfactant. The amount of the precursor coating material may be varied to change the continuity of as-formed coating or layer. For example, as illustrated in FIG. 6A, the positive electroactive material 600 may be partially coated (see coating 610) when the concentration of the precursor coating material is about 0.2 wt. %, while as illustrated in FIG. 6B, the positive electroactive material 600 may be fully coated (see coating 612) when the concentration of the precursor coating material is about 2 wt. %.

With renewed reference to FIG. 5, in certain variations, the preparing 510 may include contacting 512 the precursor coating material and/or precursor positive electroactive material to the solvent and/or surfactant to form the admixture. In certain variations, the preparing 510 may include the agitating 514. The precursor coating material and the precursor positive electroactive material may be added simultaneously or consecutively to the solvent and/or surfactant. The agitating 514 may include using a magnetic stirring process under $N_2$ to apply a stirring force. The agitating 514 may continue for a period less than or equal to about 24 hours, and in certain aspects, optionally about 2 hours.

The precursor coating material may include, for example, ceric ammonium nitrate, cerium nitrate, cerium acetate, cerium hydroxide, cerium chloride, cerium acetylacetonate hydrate, cerium tri(methylsilyl)amide, cerium tetrakis(diisopropylamide), or any combination thereof. The precursor positive electroactive material may include a nickel-rich electroactive material. For example, the precursor positive electroactive material may include an electroactive material represented by $LiNi_{1-x-y-z}Co_xMn_yAl_zO_2$ (where $0.02 \leq x \leq 0.20$, $0.01 \leq y \leq 0.12$, $0.01 \leq z \leq 0.08$, which comprises greater than or equal to about 60 molar percent of nickel, and in certain aspects, optionally greater than or equal to about 80 molar percent. The solvent and/or surfactant may include, for example, water, 1-octadecene, oleylamine, diphenyl ether, oleic acid, cetyltrimethyl ammonium bromide, octadecylamine, 1,2-hexadecanediol, polyethylene glycol, or any combination thereof.

In certain variations, the method 500 may include contacting 520 a precipitant to the admixture. The precipitant (also referred to as a precipitating agent) may help to precipitate the precursor coating materials onto surfaces of the precursor positive electroactive material. In certain variations, the precipitant may be contacted to the solution using a drop wise process. The precipitant may include, for example, sodium hydroxide, ammonium hydroxide, ammonium bicarbonate, potassium carbonate, sodium carbonate, poly(vinylpyrrolidone), citric acid, trisodium phosphate dodecahydrate, dithio-polydopamine, 1,4-butanediol, ethylenediamine, ethylene glycol, methanol, folic acid, tetrabutyl ammonium hydroxide, or any combination thereof.

In certain variations, the method 500 may include sintering 530 the precursor coating material to form the oxygen storage material coatings or layers on surfaces of the precursor positive electroactive materials to form the electroactive material. For example, sintering 530 may decompose the precursor coating material to form the desirable oxygen storage material. In certain variations, the sintering 520 may include heating the precursor coating material as precipitated on the precursor positive electroactive materials to a temperature greater than or equal to about 300° C. to less than or equal to about 1,000° C., and in certain aspects, optionally greater than or equal to about 500° C. to less than or equal to about 900° C., and/or applying an atmosphere (such as air, oxygen, nitrogen or argon) to the precursor coating material as precipitated on the precursor positive electroactive materials. For example, sintering in a nitrogen-containing atmosphere may form a non-stoichiometric oxygen storage material, such as $CeO_{2-x}$, where $0<x \leq 0.5$. The heat and the atmosphere may be applied simultaneously or consecutively, and in certain variations, the heat and/or the atmosphere may be applied for a period greater than or equal to about 1 hour to less than or equal to about 10 hours, and in certain aspects, optionally about 5 hours. Although not illustrated, it should be appreciated that, in certain variations, the method 500 may further include one or more separation steps, including, for example, filtration, centrifuge, and/or one or more drying steps to removed residue solvent and/or surfactant, and one or more additional calcination or sintering steps.

In addition to the solution precipitation method as illustrated in FIG. 5, it should be appreciated that in other variations, although not illustrated, the electroactive material including the oxygen storage material coatings or layers may be prepared using powder dry coating processes (e.g., ball milling, acoustic mixer), sol-gel processes, hydrothermal, solvothermal, thermal decomposition, spray pyrolysis, thermal hydrolysis, micro emulsion, Pechini processes, atomic layer deposition (ALD) processes, chemical vapor deposition (CVD) processes, electrodeposition processes, magnetron sputtering processes, dip-coating processes, spring-coating processes, roll-coating processes, spraying processes, flow-coating processes, doctor-blade casting processes, or any combination thereof.

Certain features of the current technology are further illustrated in the following non-limiting examples.

Example 1

Example batteries and battery cells may be prepared in accordance with various aspects of the present disclosure.

For example, a first example cell 810 may include a first positive electroactive material layer including one or more conductive oxygen storage material coatings or layers. For example, the first positive electroactive material layer may include a nickel-rich positive electroactive material (e.g., $LiNi_{1-x-y-z}Co_xMn_yAl_zO_2$ (where $0.02 \leq x \leq 0.20$, $0.01 \leq y \leq 0.12$, $0.01 \leq z \leq 0.08$) (NCMA), which comprises greater than or equal to about 80 molar percent of nickel) and one or more oxygen storage material coatings or layers including, for example, $CeO_2$, prepared using a 0.5 wt. % aqueous solution in accordance with various aspects of the present disclosure.

A second example cell 820 may include a second positive electroactive material layer including one or more conductive oxygen storage material coatings or layers. For example, the second positive electroactive material layer may include a nickel-rich positive electroactive material (e.g., $LiNi_{1-x-y-z}Co_xMn_yAl_zO_2$ (where $0.02 \leq x \leq 0.20$, $0.01 \leq y \leq 0.12$, $0.01 \leq z \leq 0.08$) (NCMA), which comprises greater than or equal to about 80 mass % of nickel) and one or more oxygen storage material coatings or layers including, for example, $CeO_2$, prepared using a 1 wt. % aqueous solution in accordance with various aspects of the present disclosure.

A third example cell 830 may include a third positive electroactive material layer including one or more conductive oxygen storage material coatings or layers. For example, the third positive electroactive material layer may include a nickel-rich positive electroactive material (e.g., $LiNi_{1-x-y-z}Co_xMn_yAl_zO_2$ (where $0.02 \leq x \leq 0.20$, $0.01 \leq y \leq 0.12$, $0.01 \leq z \leq 0.08$) (NCMA), which comprises greater than or equal to about 80 mass % of nickel) and one or more oxygen storage material coatings or layers including, for example, $CeO_2$, prepared using a 2 wt. % aqueous solution in accordance with various aspects of the present disclosure.

A fourth example cell 840 may include a fourth positive electroactive material layer including one or more conductive oxygen storage material coatings or layers. For example, the fourth positive electroactive material layer may include a nickel-rich positive electroactive material (e.g., $LiNi_{1-x-y-z}Co_xMn_yAl_zO_2$ (where 0.02≤x≤0.20, 0.01≤y≤0.12, 0.01≤z≤0.08) (NCMA), which comprises greater than or equal to about 80 mass % of nickel) and one or more conductive oxygen storage material coatings or layers including, for example, $CeO_2$—$Gd_2O_3$, prepared using a 0.5 wt. % aqueous solution in accordance with various aspects of the present disclosure.

A fifth example cell 850 may include a fifth positive electroactive material layer including one or more conductive oxygen storage material coatings or layers. For example, the fifth positive electroactive material layer may include a nickel-rich positive electroactive material (e.g., $LiNi_{1-x-y-z}Co_xMn_yAl_zO_2$ (where 0.02≤x≤0.20, 0.01≤y≤0.12, 0.01≤z≤0.08) (NCMA), which comprises greater than or equal to about 80 mass % of nickel) and one or more conductive oxygen storage material coatings or layers including, for example, $CeO_2$—$Gd_2O_3$, prepared using a 1 wt. % aqueous solution in accordance with various aspects of the present disclosure.

A sixth example cell 860 may include a sixth positive electroactive material layer including one or more conductive oxygen storage material coatings or layers. For example, the sixth positive electroactive material layer may include a nickel-rich positive electroactive material (e.g., $LiNi_{1-x-y-z}Co_xMn_yAl_zO_2$ (where 0.02≤x≤0.20, 0.01≤y≤0.12, 0.01≤z≤0.08) (NCMA), which comprises greater than or equal to about 80 mass % of nickel) and one or more conductive oxygen storage material coatings or layers including, for example, $CeO_2$—$Gd_2O_3$, prepared using a 2 wt. % aqueous solution in accordance with various aspects of the present disclosure.

A reference or comparative cell 870 may include a seventh positive electroactive material layer. The seventh positive electroactive material layer may include the nickel-rich positive electroactive material (e.g., $LiNi_{1-x-y-z}Co_xMn_yAl_zO_2$ (where 0.02≤x≤0.20, 0.01≤y≤0.12, 0.01≤z≤0.08) (NCMA), which comprises greater than or equal to about 80 mass % of nickel).

Figure 7:
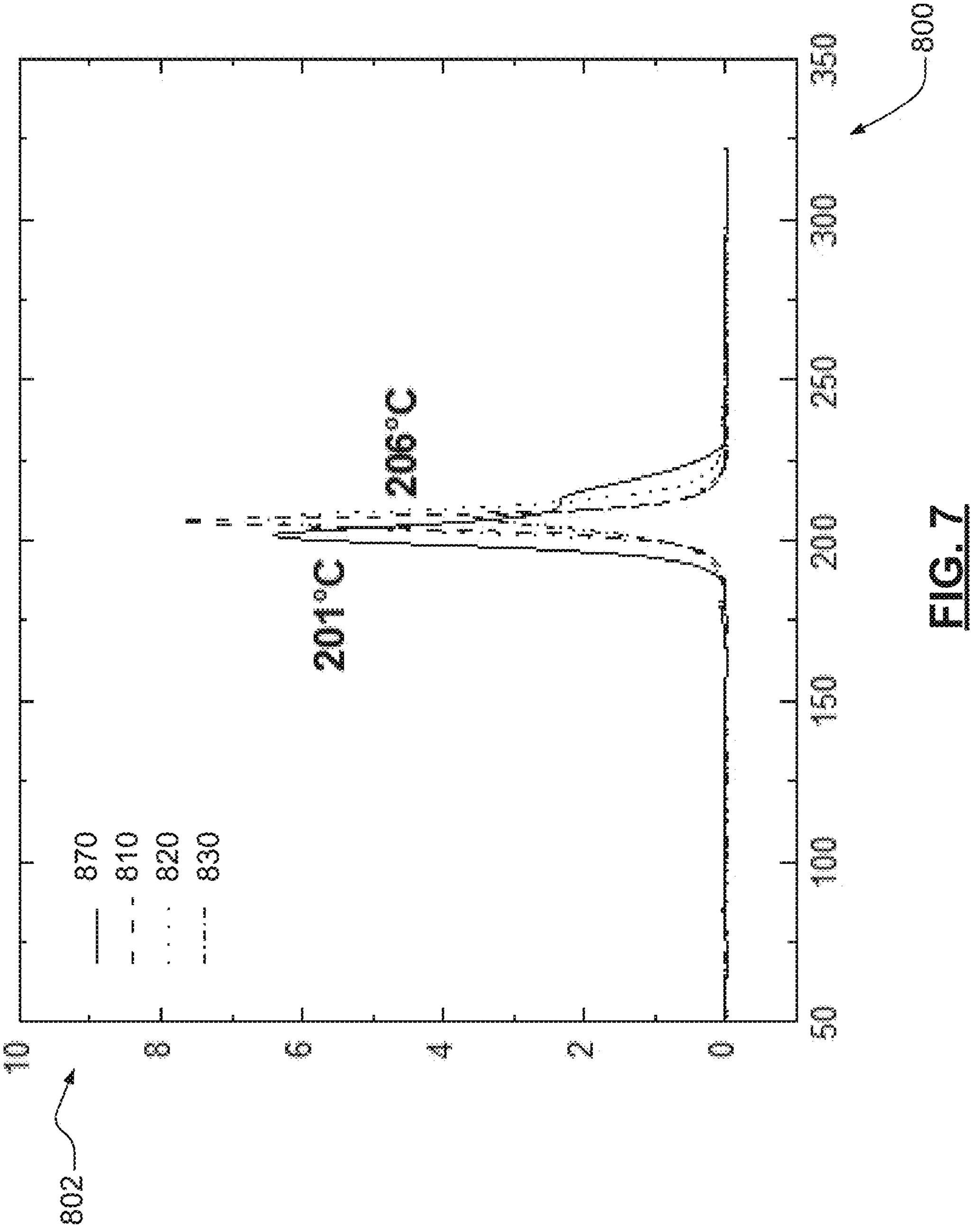
FIG. 7 is a graphical illustration demonstrating the thermal stability of an example cell including a nickel-rich electroactive material and one or more oxygen storage material coatings or layers in accordance with various aspects of the present disclosure.

FIG. 7 is a graphical illustration representing release temperatures of the example cells 810, 820, 830 as compared to the comparative cell 870, where the x-axis 800 represents temperatures (° C.), and the y-axis 802 represents heat flow (mW/mg). As illustrated, the comparative cell 870 has a peak temperature at about 201° C., while the example cells 810, 820, 830 have peak temperatures at about 206° C. A delayed peak temperature demonstrates improved thermal properties.

Figure 8:
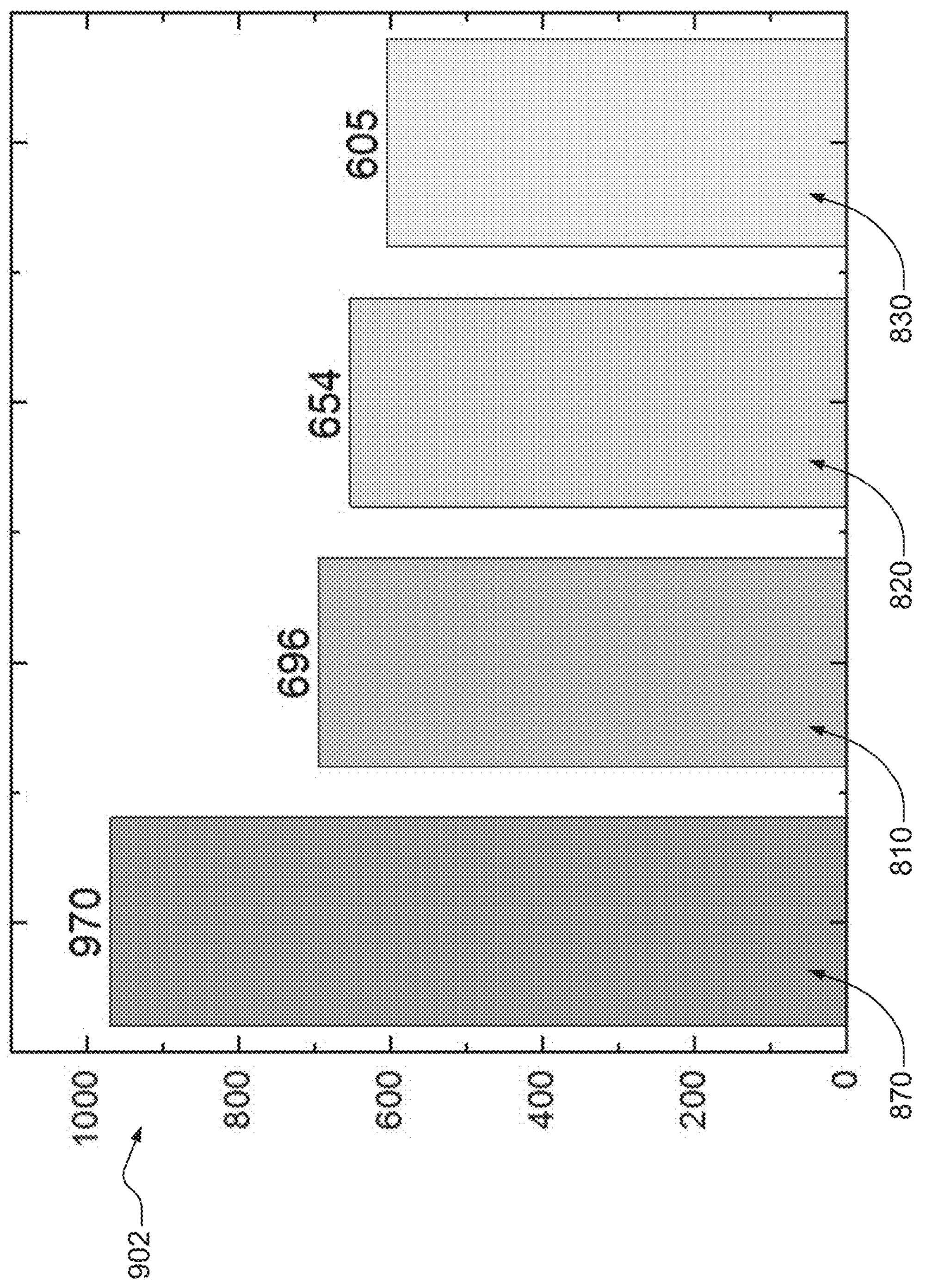
FIG. 8 is a graphical illustration demonstrating the resistance of an example cell including a nickel-rich electroactive material and one or more oxygen storage material coatings or layers in accordance with various aspects of the present disclosure.

FIG. 8 is a graphical illustration representing the heat release of the example cells 810, 820, 830 as compared to the comparative cell 870, where the y-axis 902 represents heat release (J/g). As illustrated, the example cells 810, 820, 830 have heat reductions as compared to the comparative cell 870. For example, the example cell 830 has about a 38% heat release reduction and 5° C. temperature delay as compared to the comparative cell 870.

Figure 9:
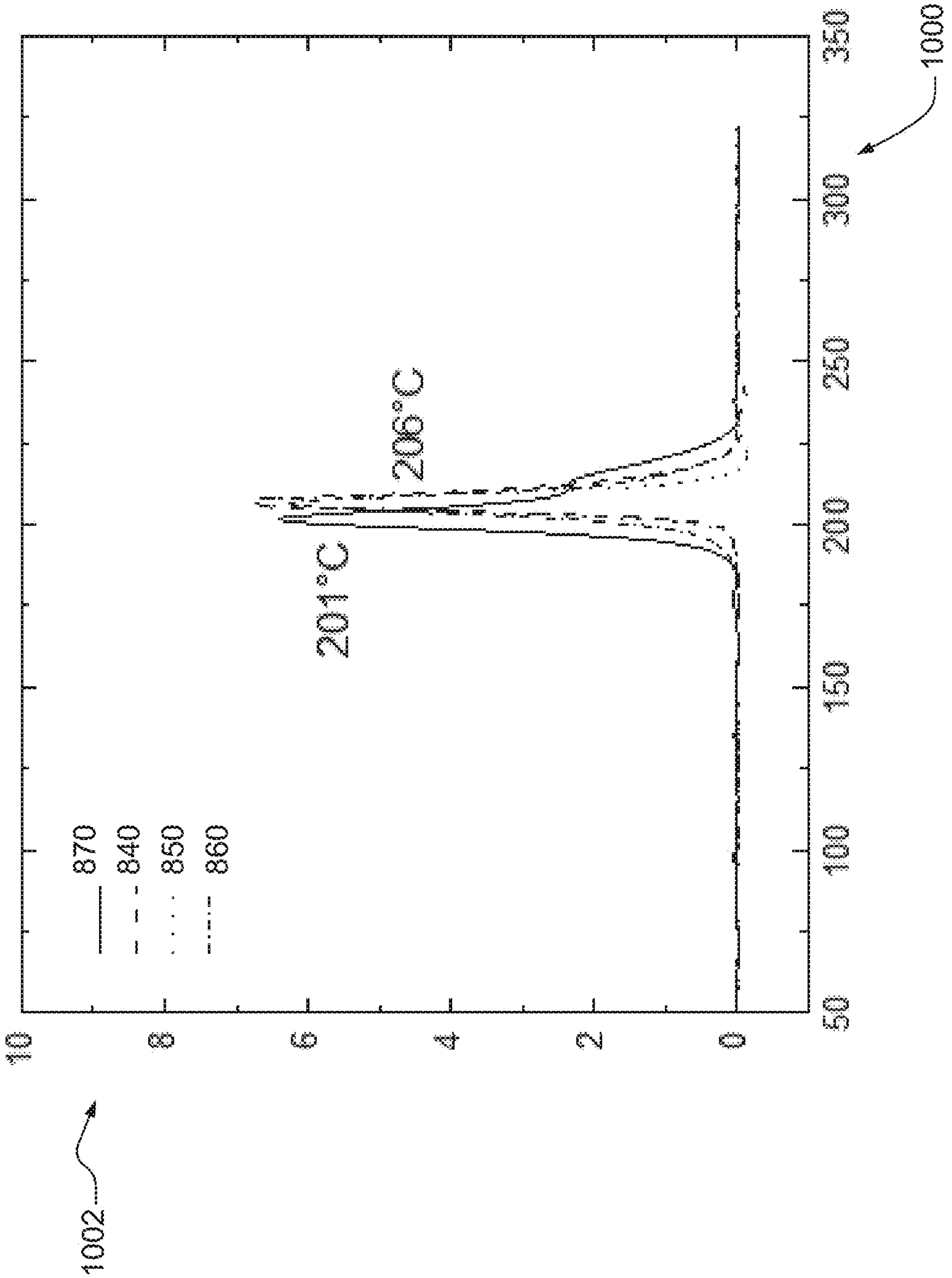
FIG. 9 is a graphical illustration demonstrating the thermal stability of an example cell including a nickel-rich electroactive material and one or more oxygen storage material coatings or layers in accordance with various aspects of the present disclosure.

FIG. 9 is a graphical illustration representing release temperatures of the example cells 840, 850, 860 as compared to the comparative cell 870, where the x-axis 1000 represents temperatures (° C.), and the y-axis 1002 represents heat flow (mW/mg). As illustrated, the comparative cell 870 has a peak temperature at about 201° C., while the example cells 840, 850, 860 have peak temperatures at about 206° C. A delayed peak temperature demonstrates improved thermal properties.

Figure 10:
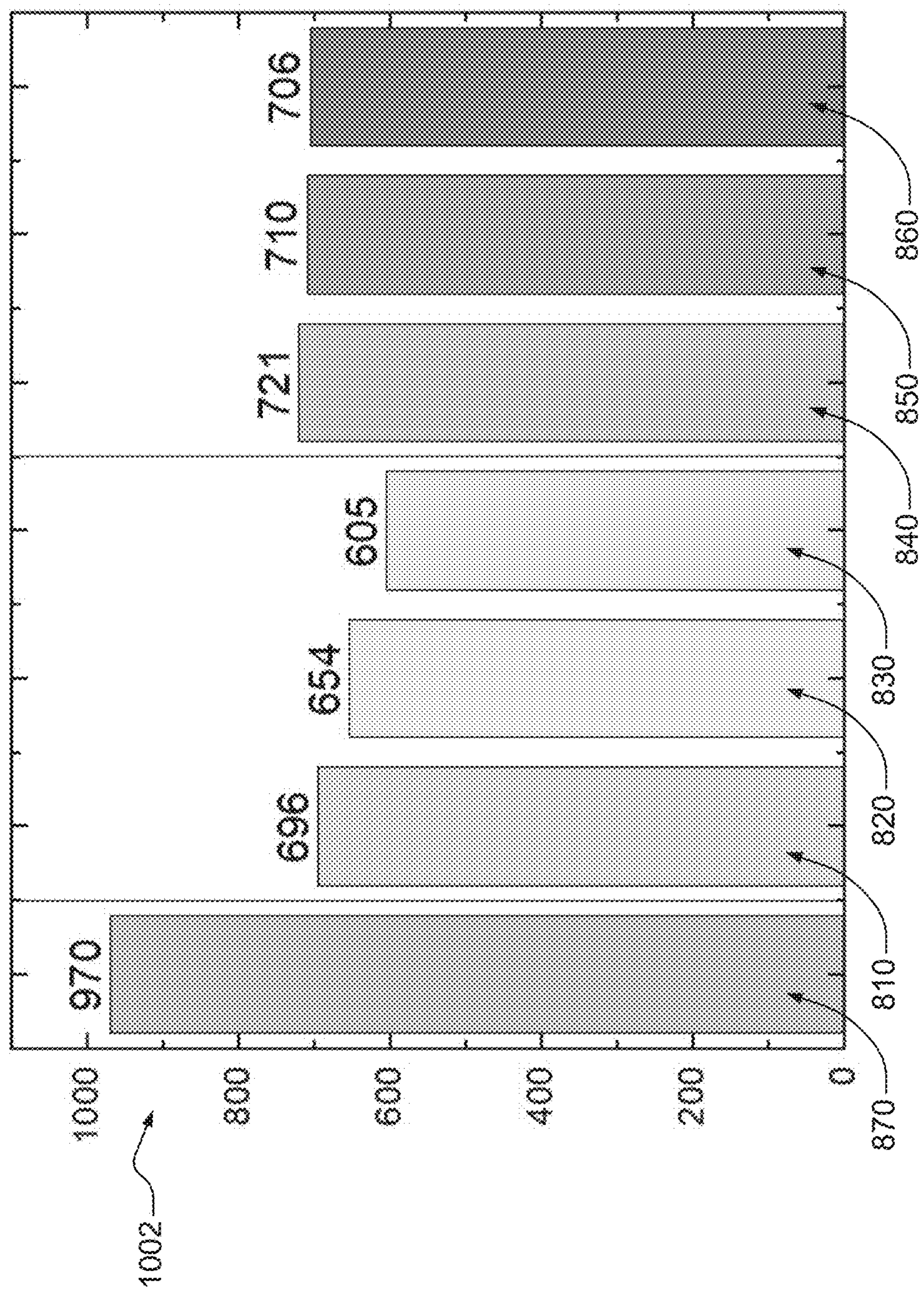
FIG. 10 is a graphical illustration demonstrating the resistance of an example cell including a nickel-rich electroactive material and one or more oxygen storage material coatings or layers in accordance with various aspects of the present disclosure.

FIG. 10 is a graphical illustration representing the heat release of the example cells 810, 820, 830, 840, 850, 860 as compared to the comparative cell 870, where the y-axis 1102 represents heat release (J/g). As illustrated, the example cells 810, 820, 830, 840, 850, 860 have heat reductions as compared to the comparative cell 870. For example, the example cell 830 has about a 38% heat release reduction and 5° C. temperature delay as compared to the comparative cell 870.

Figure 11:
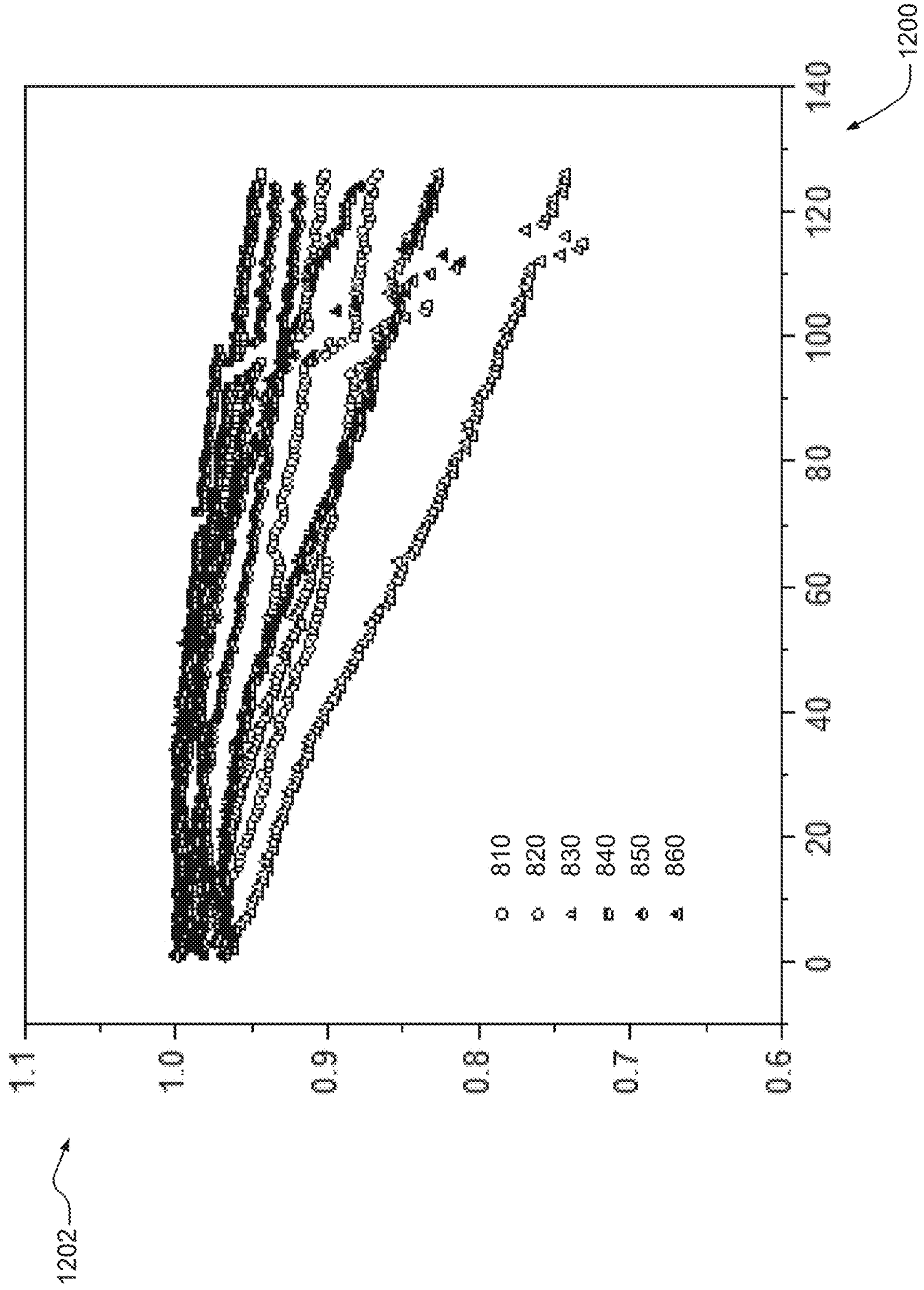
FIG. 11 is a graphical illustration demonstrating the capacity retention of an example cell including a nickel-rich electroactive material and one or more oxygen storage material coatings or layers in accordance with various aspects of the present disclosure.

FIG. 11 is a graphical illustration representing the capacity retention of the example cells 810, 820, 830, 840, 850, 860, 870, where the x-axis 1200 represents cycle number, and the y-axis 1202 represents capacity retention (%).

In certain instances, the first positive electroactive material of the first cell 810 including the $CeO_2$ coated NCMA (prepared using a 0.5 wt. % aqueous solution) may have a lithium-ion diffusivity (Ds) of about $5.02\times10^{-11}$ $cm^2/s$, while the fourth positive electroactive material of the fourth cell 840 including the $CeO_2$—$Gd_2O_3$ coated NCMA (prepared using a 0.5 wt. % aqueous solution) may have a lithium-ion diffusivity (Ds) of about $6.59\times10^{-11}$ $cm^2/s$. The second positive electroactive material of the second cell 840 including the $CeO_2$ coated NCMA (prepared using a 1 wt. % aqueous solution) may have a lithium-ion diffusivity (Ds) of about $3.56\times10^{-11}$ $cm^2/s$, while the fifth positive electroactive material of the fifth cell 850 including the $CeO_2$—$Gd_2O_3$ coated NCMA (prepared using a 1 wt. % aqueous solution) may have a lithium-ion diffusivity (Ds) of about $4.95\times10^{-11}$ $cm^2/s$. The third positive electroactive material of the third cell 830 including the $CeO_2$ coated NCMA (prepared using a 2 wt. % aqueous solution) may have a lithium-ion diffusivity (Ds) of about $3.33\times10^{-11}$ $cm^2/s$, while the sixth positive electroactive material of the sixth cell 860 including the $CeO_2$—$Gd_2O_3$ coated NCMA (prepared using a 2 wt. % aqueous solution) may have a lithium-ion diffusivity (Ds) of about $3.83\times10^{-11}$ $cm^2/s$.

Example 2

Example batteries and battery cells may be prepared in accordance with various aspects of the present disclosure.

For example, a first example cell 1310 may include a first positive electroactive material layer including one or more conductive oxygen storage material coatings or layers. For example, the first positive electroactive material layer may include a nickel-rich positive electroactive material (e.g., $LiNi_{1-x-y-z}Co_xMn_yAl_zO_2$ (where 0.02≤x≤0.20, 0.01≤y≤0.12, 0.01≤z≤0.08) (NCMA), which comprises greater than or equal to about 80 mass % of nickel) and one or more oxygen storage material coatings or layers including, for example, $CeO_2$, prepared using a 2 wt. % organic solution in accordance with various aspects of the present disclosure.

A second example cell 1320 may include a second positive electroactive material layer including one or more conductive oxygen storage material coatings or layers. For example, the second positive electroactive material layer may include a nickel-rich positive electroactive material (e.g., $LiNi_{1-x-y-z}Co_xMn_yAl_zO_2$ (where 0.02≤x≤0.20, 0.01≤y≤0.12, 0.01≤z≤0.08) (NCMA), which comprises greater than or equal to about 80 mass % of nickel) and one or more oxygen storage material coatings or layers including, for example, $CeO_2$, prepared using a 0.2 wt. % organic solution in accordance with various aspects of the present disclosure.

A third example cell 1330 may include a third positive electroactive material layer including one or more conductive oxygen storage material coatings or layers. For example, the third positive electroactive material layer may include a nickel-rich positive electroactive material (e.g., $LiNi_{1-x-y-z}CO_xMn_yAl_zO_2$ (where 0.02≤x≤0.20, 0.01≤y≤0.12, 0.01≤z≤0.08) (NCMA), which comprises greater than or equal to about 80 mass % of nickel) and one or more oxygen storage material coatings or layers including, for example, $CeO_2$, prepared using a 2 wt. % aqueous solution in accordance with various aspects of the present disclosure.

A comparative cell 1340 may include a fourth positive electroactive material layer. The fourth positive electroactive material layer may include the nickel-rich positive electroactive material (e.g., $LiNi_{1-x-y-z}CO_xMn_yAl_zO_2$ (where 0.02≤x≤0.20, 0.01≤y≤0.12, 0.01≤z≤0.08) (NCMA), which comprises greater than or equal to about 80 mass % of nickel).

Figure 12:
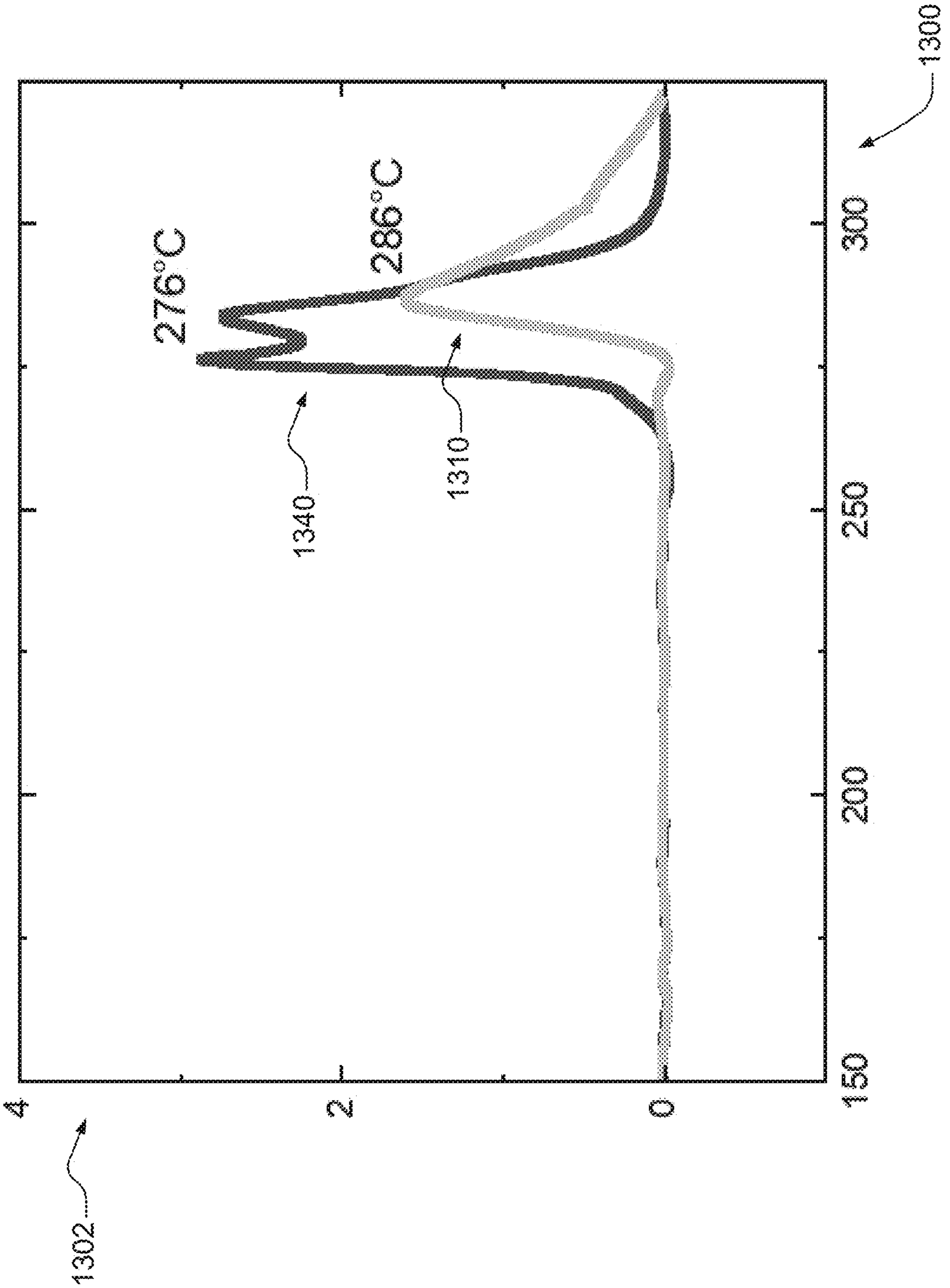
FIG. 12 is a graphical illustration demonstrating the thermal stability of an example cell including a nickel-rich electroactive material and one or more oxygen storage material coatings or layers in accordance with various aspects of the present disclosure.

FIG. 12 is a graphical illustration representing release temperatures of the example cell 1310 at a 25% state of charge (where the above examples are at a 100% state of charge) as compared to the comparative cell 1340, where the x-axis 1300 represents temperatures (° C.), and the y-axis 1302 represents heat flow (mW/mg). As illustrated, the reference cell 1340 has a peak temperature at about 276° C., while the example cells 1310 has a peak temperature at about 286° C. A delayed peak temperature demonstrates improved thermal properties.

Figure 13:
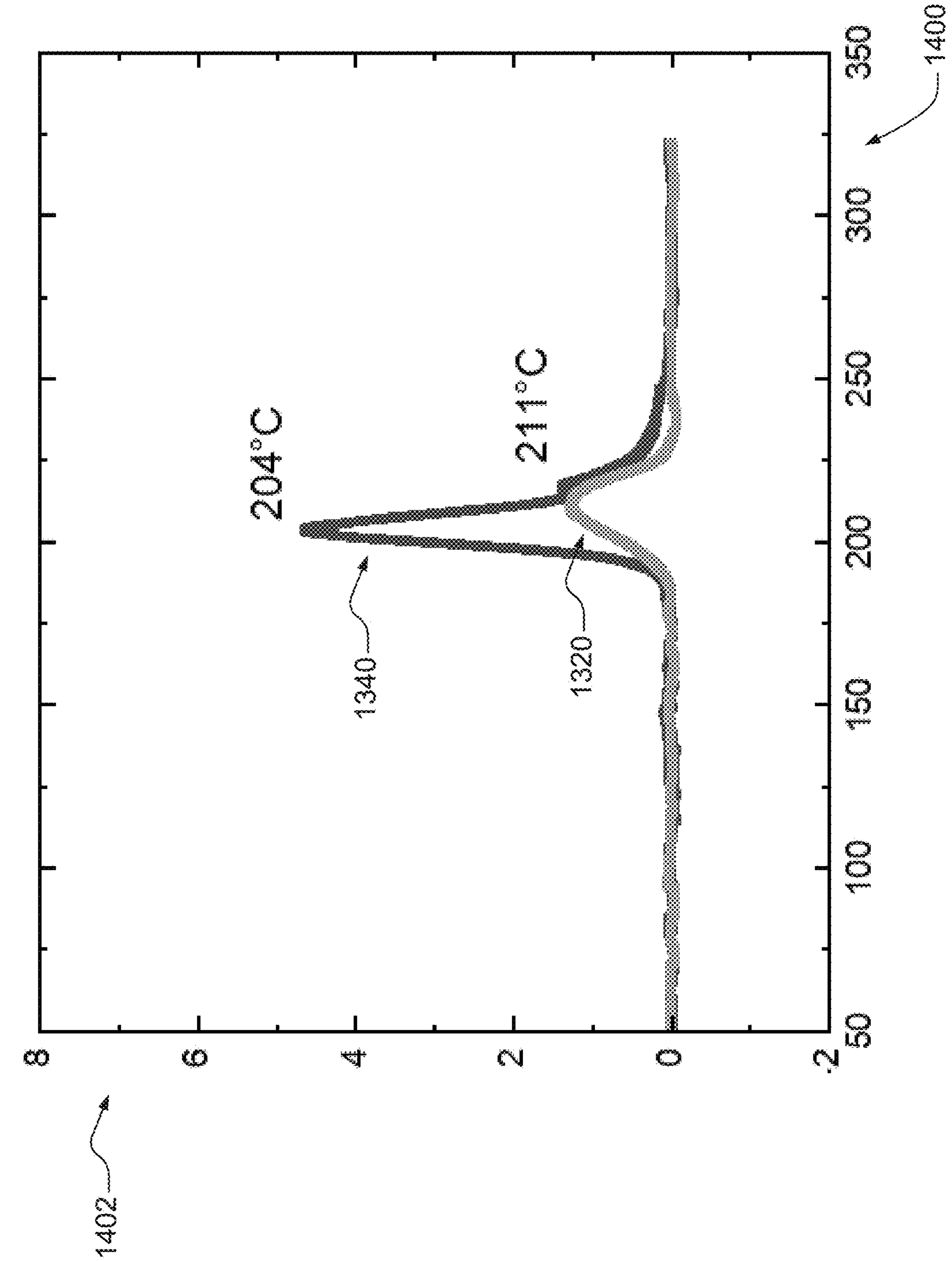
FIG. 13 is a graphical illustration demonstrating the thermal stability of an example cell including a nickel-rich electroactive material and one or more oxygen storage material coatings or layers in accordance with various aspects of the present disclosure.

FIG. 13 is a graphical illustration representing release temperatures of the example cell 1320 at a 100% state of charge as compared to the comparative cell 1340, where the x-axis 1400 represents temperatures (C), and the y-axis 1402 represents heat flow (mW/mg). As illustrated, the reference cell 1350 has a peak temperature at about 204° C., while the example cells 1320 has a peak temperature at about 211° C. A delayed peak temperature demonstrates improved thermal properties.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electroactive material for an electrochemical cell, the electroactive material comprising:

a plurality of electroactive material particles, at least a portion of the electroactive material particles of the plurality of electroactive material particles having a coating comprising an oxygen storage material, at least a first portion of the oxygen storage material being in solid solution with a cation selected from the group consisting of: $Gd^{3+}$, $Sm^{3+}$, $Cu^{2+}$, $Ca^{2+}$, $Sr^{2+}$, and combinations thereof.

2. The electroactive material of claim 1, wherein the oxygen storage material is selected from the group consisting of: cerium oxide ($CeO_2$), manganese oxide ($MnO_2$), and combinations thereof.

3. The electroactive material of claim 1, wherein the portion of electroactive material particles of the plurality of electroactive material particles having the coating have a lithium diffusion coefficient greater than or equal to about $10^{-15}$ $cm^2 \cdot s$ at about 25° C.

4. The electroactive material of claim 1, wherein greater than 0 wt. % to less than or equal to about 10 wt. % of the electroactive material particles of the plurality of electroactive material particles comprise the coating.

5. The electroactive material of claim 1, wherein the electroactive material particles comprise a nickel-rich electroactive material represented by:

$$LiM^1_xM^2_yM^3_zNi_{(1-x-y-z)}O_2$$

where $M^1$, $M^2$, and $M^3$ are each a transition metal independently selected from the group consisting of: manganese (Mn), cobalt (Co), aluminum (Al), iron (Fe), and combinations thereof, where 0≤x≤1, 0≤y≤1, and 0≤z≤1 and 1-x-y-z is greater than 0.6.

6. The electroactive material of claim 1, wherein the coating is a discontinuous coating covering less than or equal to about 90% of a total surface area of the respective electroactive material particles, and the coating has an average thicknesses greater than or equal to about 2 nanometers to less than or equal to about 200 nanometers.

7. The electroactive material of claim 1, wherein the coating is a continuous coatings covering greater than or equal to about 90% of a total surface area of the respective electroactive material particles, and the coating has an average thicknesses greater than or equal to about 2 nanometers to less than or equal to about 200 nanometers.

8. A method for preparing an electroactive material for an electrochemical cell, the method comprising:

sintering a precursor oxygen storage material precipitated on surfaces of a plurality of electroactive material particles in a solvent, wherein during the sintering the precursor oxygen storage material is reduced to form an oxygen storage material on the surfaces, at least a portion of the precursor oxygen storage material is in solid solution with a cation selected from the group consisting of: $Gd^{3+}$, $Sm^{3+}$, $Cu^{2+}$, $Ca^{2+}$, $Sr^{2+}$, and combinations thereof, and the plurality of electroactive material particles and the oxygen storage material defines the electroactive material.

9. The method of claim 8, wherein the electroactive material particles comprise a nickel rich electroactive material represented by:

$$LiM^1_xM^2_yM^3_zNi_{(1-x-y-z)}O_2$$

where $M^1$, $M^2$, and $M^3$ are each a transition metal independently selected from the group consisting of: manganese (Mn), cobalt (Co), aluminum (Al), iron (Fe), and combinations thereof, where 0≤x≤1, 0≤y≤1, and 0≤z≤1 and 1-x-y-z is greater than 0.6.

10. The method of claim 8, wherein the solvent is selected from the group consisting of: water, 1-octadecene, oleylamine, diphenyl ether, oleic acid, cetyltrimethyl ammonium bromide, octadecylamine, 1,2-hexadecanediol, polyethylene glycol, and combinations thereof.

11. The method of claim 8, wherein the precursor oxygen storage material is selected from the group consisting of: ceric ammonium nitrate, cerium nitrate, cerium acetate, cerium hydroxide, cerium chloride, cerium acetylacetonate hydrate, cerium tri(methylsilyl)amide, cerium tetrakis(diisopropylamide), and combination thereof.

12. The method of claim 8, wherein the method further comprises:

precipitating the precursor oxygen storage material onto the surfaces of the electroactive material particles, wherein the precipitating comprises contacting a precipitant to an admixture comprising the precursor oxygen storage material, the plurality of electroactive material particles, and the solvent.

13. The method of claim 12, wherein the precipitant is selected from the group consisting of: sodium hydroxide, ammonium hydroxide, ammonium bicarbonate, potassium carbonate, sodium carbonate, poly(vinylpyrrolidone), citric acid, trisodium phosphate dodecahydrate, dithio-polydopamine, 1,4-butanediol, ethylenediamine, ethylene glycol, methanol, folic acid, tetrabutyl ammonium hydroxide, and combinations thereof.

14. The method of claim 12, wherein the method further comprises preparing the admixture, wherein preparing the admixture comprises contacting the precursor oxygen storage material and the precursor electroactive material to the solvent to form the admixture and agitating the admixture.

15. The method of claim 12, wherein the admixture comprises greater than or equal to about 0.1 wt. % to less than or equal to about 5 wt. % of the precursor oxygen storage material, greater than or equal to about 5 wt. % to less than or equal to about 90 wt. % of the plurality of electroactive material particles, and greater than or equal to about 5 wt. % to less than or equal to about 90 wt. % of the solvent.

16. The method of claim 8, wherein the sintering comprises heating the precursor oxygen storage material to a temperature greater than or equal to about 300° C. to less than or equal to about 1,000° C.

17. A method for preparing an electroactive material for an electrochemical cell, the method comprising:

precipitating an oxygen storage material precursor onto surfaces of a plurality of electroactive material particles by contacting a precipitant to an admixture comprising the oxygen storage material precursor and the plurality of electroactive material particles to form a coating comprising the oxygen storage material precursor, at least a portion of the precursor oxygen storage material is in solid solution with a cation selected from the group consisting of: $Gd^{3+}$, $Sm^{3+}$, $Cu^{2+}$, $Ca^{2+}$, $Sr^{2+}$, and combinations thereof; and sintering the coating comprising the oxygen storage material precursor by heating the oxygen storage material precursor to a temperature greater than or equal to about 300° C. to less than or equal to about 1,000° C. to form a coating comprising an oxygen storage material on the surfaces of the plurality of electroactive material particles.

18. The method of claim 17, wherein the method further comprises preparing the admixture, wherein preparing the admixture comprises contacting the oxygen storage material precursor and the plurality of electroactive material particles to a solvent to form the admixture and agitating the admixture.

19. The electroactive material of claim 4, wherein a remainder of the electroactive material particles of the plurality of electroactive material particles are free from any coating.

* * * * *